United States Patent
Takeyama et al.

(10) Patent No.: US 6,975,635 B2
(45) Date of Patent: Dec. 13, 2005

(54) COMMUNICATION SYSTEM PROVIDED WITH CONTROL APPARATUS BETWEEN LOCAL NETWORK AND EXTERNAL NETWORK

(75) Inventors: Hiroaki Takeyama, Kobe (JP); Hideo Sakamoto, Nara (JP); Yasuhiro Yanagi, Katano (JP); Yuzo Kawahara, Osaka (JP); Junji Senoo, Tsu (JP)

(73) Assignee: Matsushita Electric Works, Ltd., Osaka (JP)

( * ) Notice: Subject to any disclaimer, the term of this patent is extended or adjusted under 35 U.S.C. 154(b) by 961 days.

(21) Appl. No.: 09/878,406

(22) Filed: Jun. 12, 2001

(65) Prior Publication Data

US 2002/0018478 A1 Feb. 14, 2002

(30) Foreign Application Priority Data

Jul. 11, 2000 (JP) .......................... P2000-210509

(51) Int. Cl.$^7$ .............................................. H04L 12/28
(52) U.S. Cl. ...................... 370/401; 702/117; 709/218
(58) Field of Search ................. 370/242, 243, 370/244, 245, 248, 249, 250, 338, 400, 401; 340/540; 702/108, 117

(56) References Cited

U.S. PATENT DOCUMENTS

| | | | |
|---|---|---|---|
| 5,548,578 A | * 8/1996 | Matsune et al. | ............ 370/248 |
| 5,991,795 A | 11/1999 | Howard et al. | |
| 6,138,241 A | * 10/2000 | Eckel et al. | ................. 713/300 |
| 6,437,692 B1 | * 8/2002 | Petite et al. | ................. 340/540 |
| 6,553,336 B1 | * 4/2003 | Johnson et al. | ............. 702/188 |

FOREIGN PATENT DOCUMENTS

JP 11-196197 7/1999

* cited by examiner

Primary Examiner—Bob A. Phunkulh
(74) Attorney, Agent, or Firm—Oblon, Spivak, McClelland, Maier & Neustadt, P.C.

(57) ABSTRACT

A communication system includes a local terminal apparatus connected with a local network, a remote terminal apparatus connected with an external network, and a control apparatus interposed between the local network and the external network. The local terminal apparatus includes a reply section for returning an answer signal including a status information of a processing executing section via the local network in response to a request signal received via the local network. The control apparatus includes a gateway section for receiving the request signal transmitted from the remote terminal apparatus via the external network, and thereafter, transmitting the received request signal to the local terminal apparatus via the local network, and for receiving an answer signal corresponding to the request signal from the local terminal apparatus via the local network, and thereafter, transmitting the received answer signal to the remote terminal apparatus via the external network.

6 Claims, 33 Drawing Sheets

FIRST MODIFIED PREFERRED EMBODIMENT

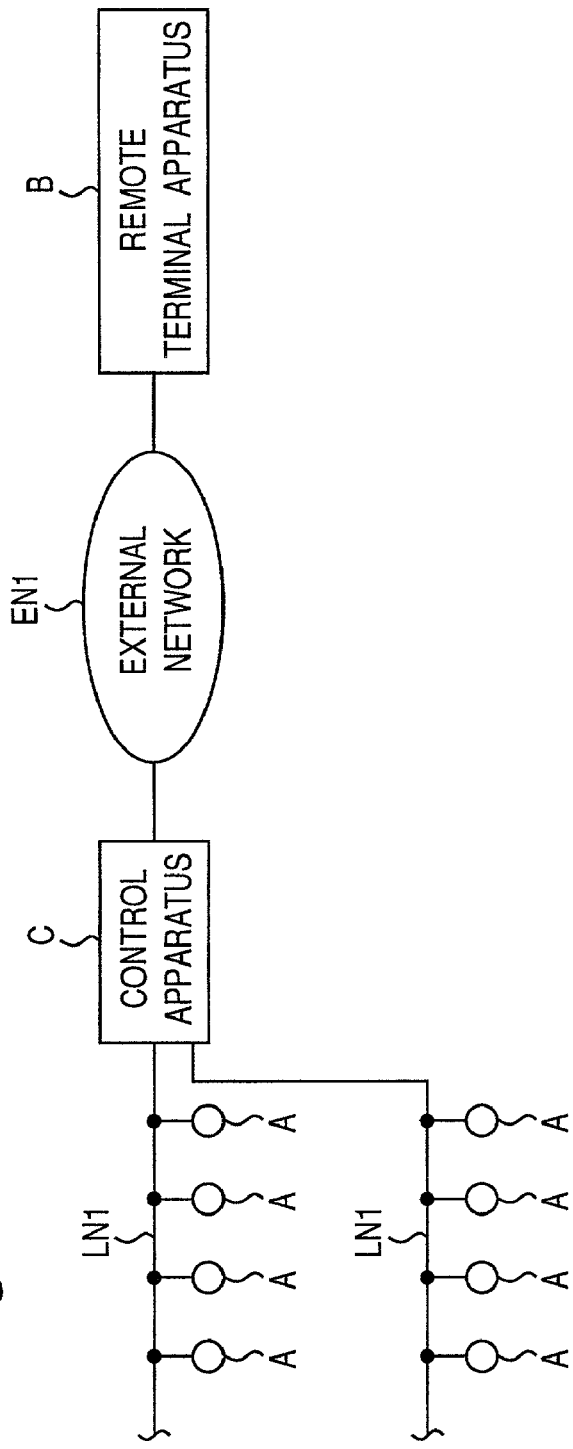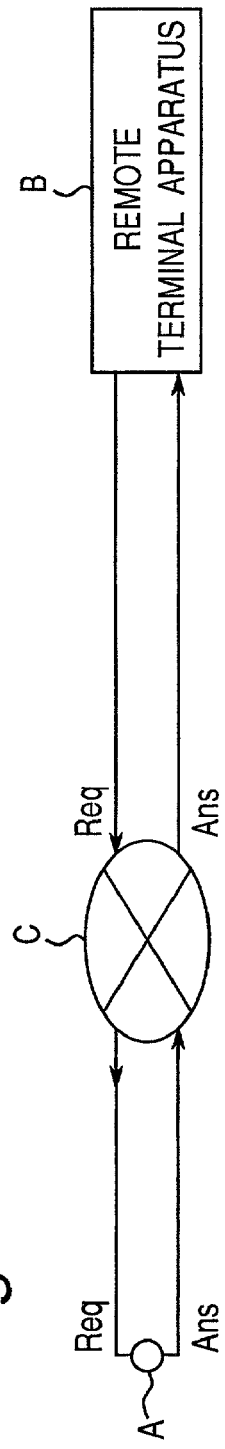

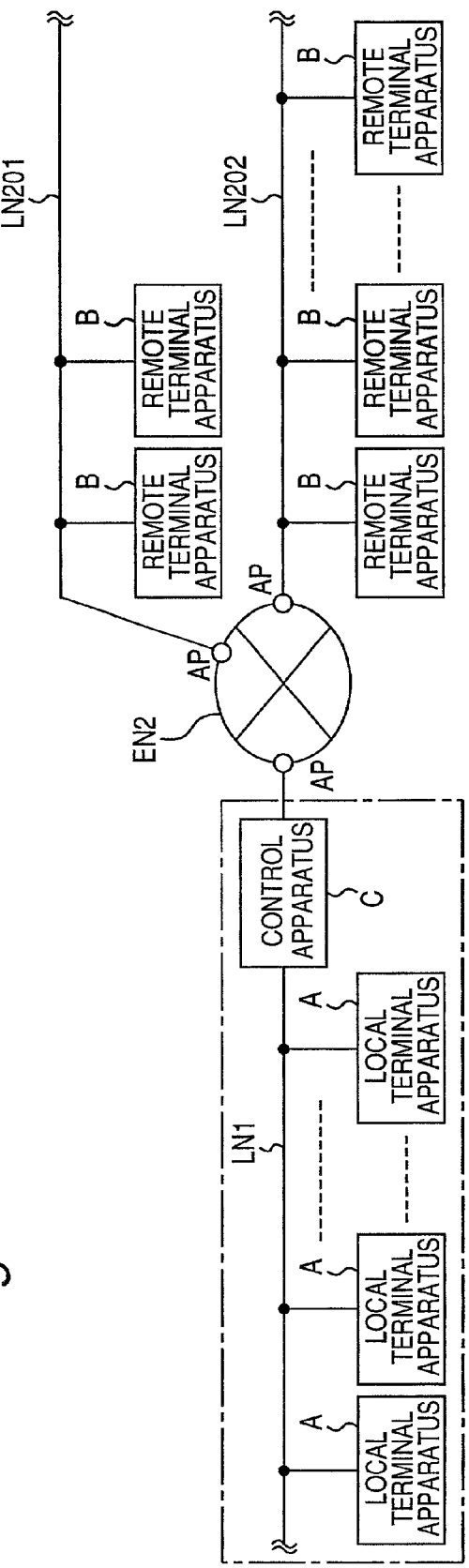
Fig.2 FIRST MODIFIED PREFERRED EMBODIMENT

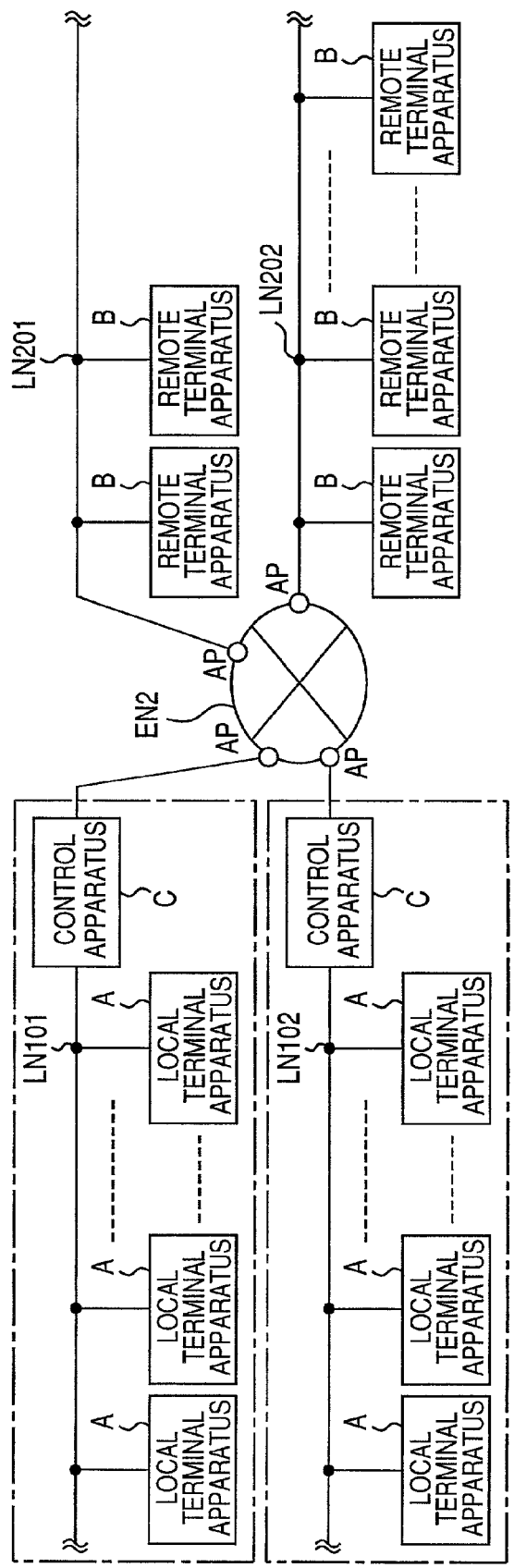
Fig. 3 SECOND MODIFIED PREFERRED EMBODIMENT

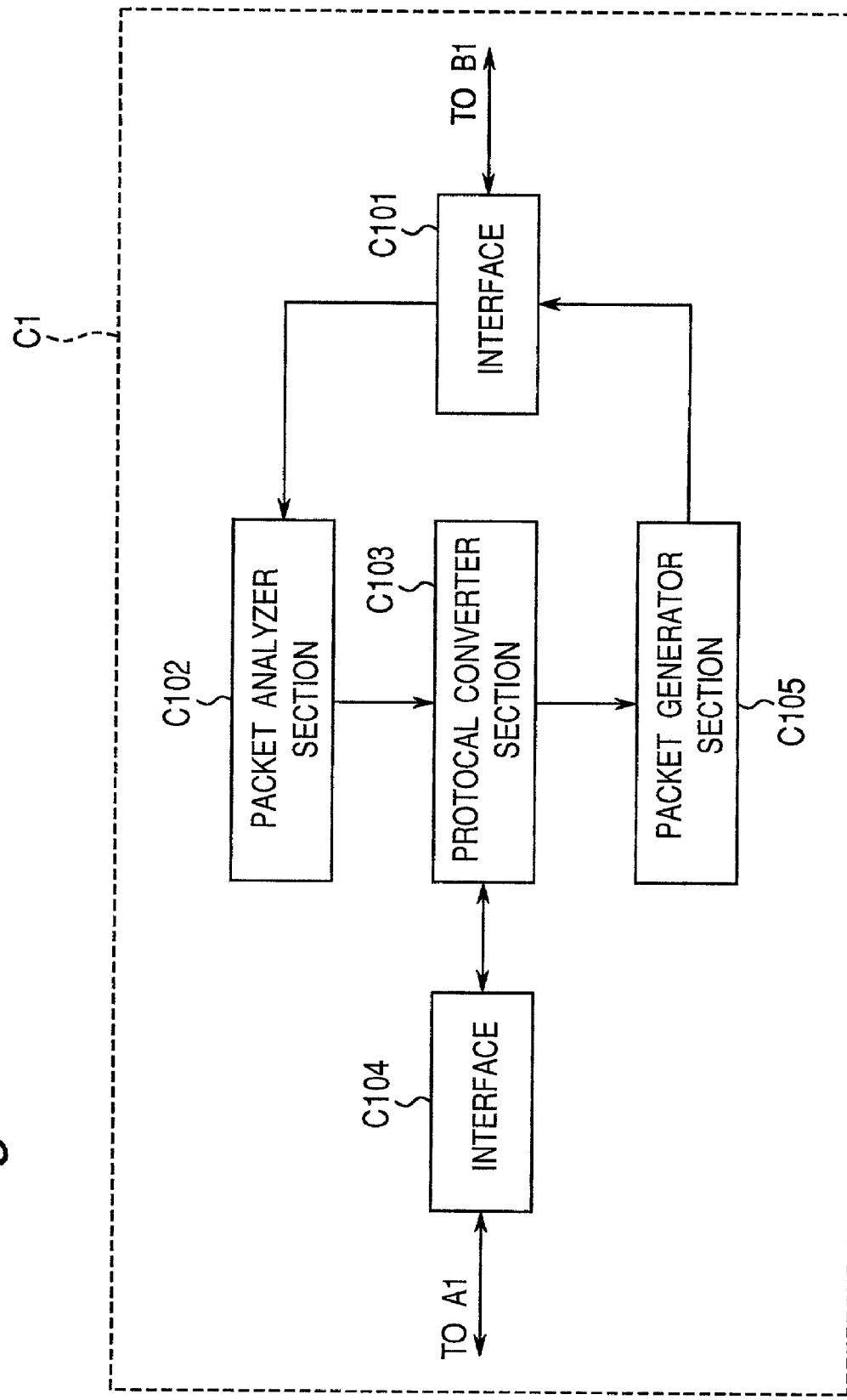
Fig.4 FIRST PREFERRED EMBODIMENT

Fig. 8  SECOND PREFERRED EMBODIMENT

Fig.11 FIFTH PREFERRED EMBODIMENT

Fig. 15  NINTH PREFERRED EMBODIMENT

Fig. 17 ELEVENTH PREFERRED EMBODIMENT

Fig.19 THIRTEENTH PREFERRED EMBODIMENT

Fig.24

TRANSMISSION DESTINATION TABLE FOR ANSWER SIGNAL

| TRANSMITTER | DESTINATION |
|---|---|
| LOCAL TERMINAL APPARATUS A1 | REMOTE TERMINAL APPARATUS B1 AND MANAGEMENT CENTER B0 |
| LOCAL TERMINAL APPARATUS A2 | REMOTE TERMINAL APPARATUS B2 |
| LOCAL TERMINAL APPARATUS A3 | REMOTE TERMINAL APPARATUS B3 AND MANAGEMENT CENTER B0 |
| ⋮ | ⋮ |

Fig.25

MODIFIED PREFERRED EMBODIMENT
TRANSMISSION DESTINATION TABLE FOR ANSWER SIGNAL

| TRANSMITTER | CHANGE IN STATUS | DESTINATION |
|---|---|---|
| LOCAL TERMINAL APPARATUS A1 | NORMAL →ABNORMAL | REMOTE TERMINAL APPARATUS B1 AND MANAGEMENT CENTER B0 |
| | ABNORMAL →NORMAL | MANAGEMENT CENTER B0 |
| LOCAL TERMINAL APPARATUS A2 | NORMAL →ABNORMAL | REMOTE TERMINAL APPARATUS B2 |
| | ABNORMAL →NORMAL | NONE |
| LOCAL TERMINAL APPARATUS A3 | NORMAL →ABNORMAL | REMOTE TERMINAL APPARATUS B3 AND MANAGEMENT CENTER B0 |
| | ABNORMAL →NORMAL | REMOTE TERMINAL APPARATUS B3 AND MANAGEMENT CENTER B0 |
| ⋮ | ⋮ | ⋮ |

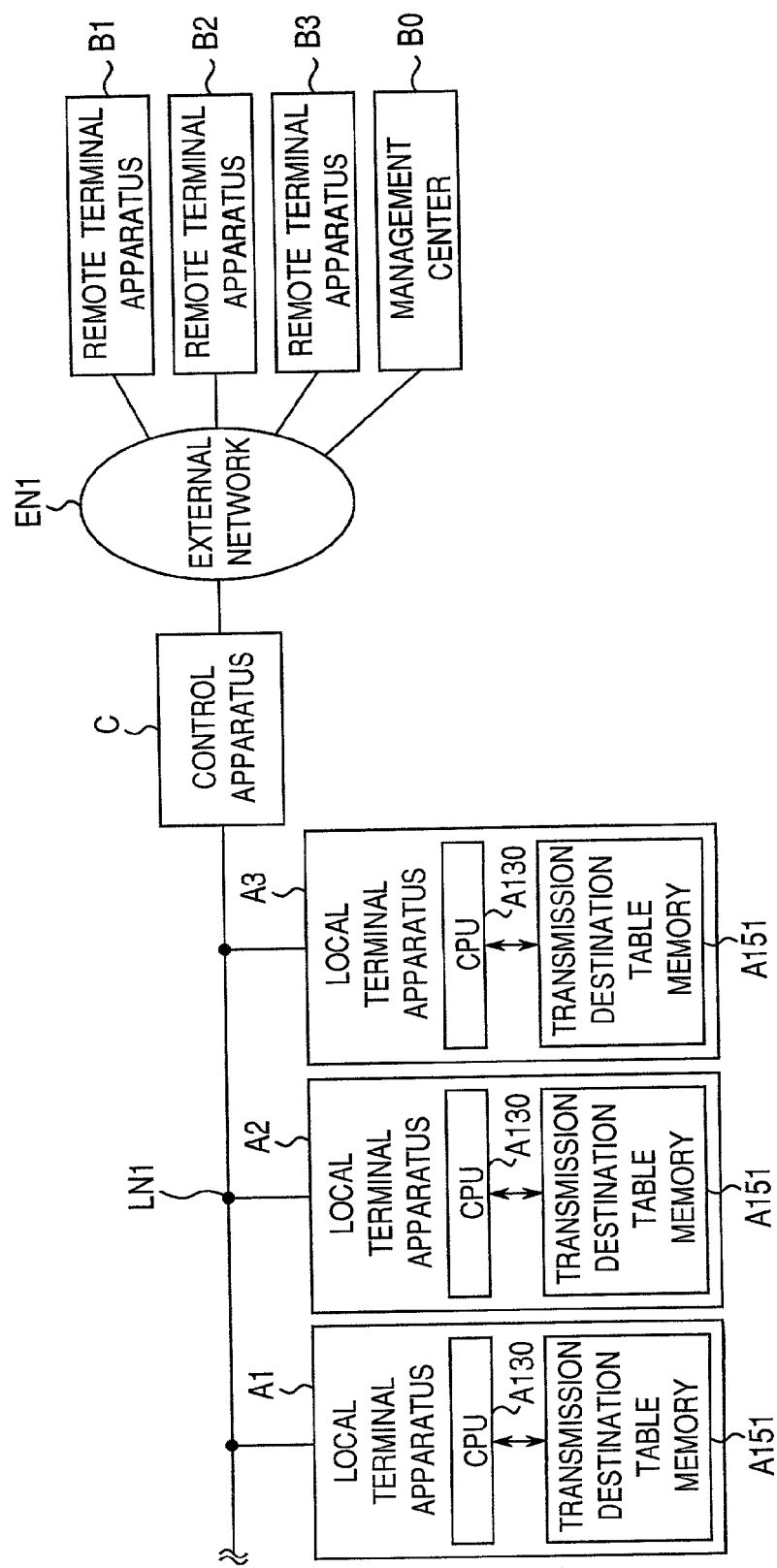
Fig.26  SEVENTEENTH PREFERRED EMBODIMENT

Fig.27

TRANSMISSION DESTINATION TABLE FOR ANSWER SIGNAL STORED IN LOCAL TERMINAL APPARATUS A1

| DESTINATION |
| --- |
| REMOTE TERMINAL APPARATUS B1 AND MANAGEMENT CENTER |

Fig.28

MODIFIED PREFERRED EMBODIMENT
TRANSMISSION DESTINATION TABLE FOR ANSWER SIGNAL STORED IN LOCAL TERMINAL APPARATUS A1

| CHANGE IN STATUS | DESTINATION |
| --- | --- |
| NORMAL →ABNORMAL | REMOTE TERMINAL APPARATUS B1 AND MANAGEMENT CENTER B0 |
| ABNORMAL →NORMAL | MANAGEMENT CENTER |

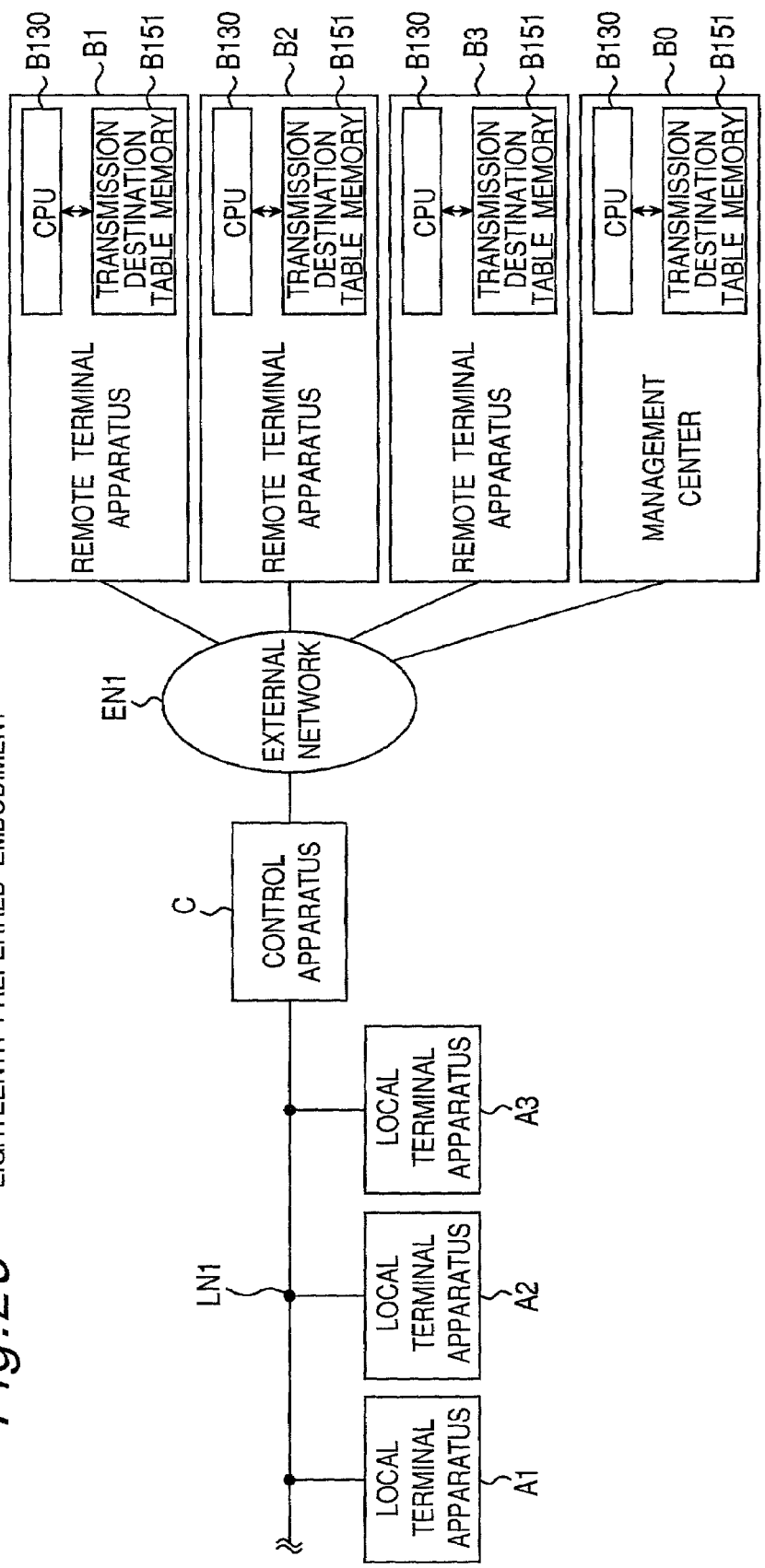
Fig.29 EIGHTEENTH PREFERRED EMBODIMENT

COMMUNICATION SYSTEM PROVIDED WITH CONTROL APPARATUS BETWEEN LOCAL NETWORK AND EXTERNAL NETWORK

BACKGROUND OF THE INVENTION

1. Field of the Invention

The present invention relates to a communication system, and in particular, to a communication system including a local terminal apparatus connected with a local network, a remote terminal apparatus connected with an external network, and a control apparatus interposed between the local network and the external network.

2. Description of the Related Art

FIG. 32A is a schematic block diagram showing a configuration of a conventional communication system, FIG. 32B is a schematic diagram showing a signal flow in the conventional communication system shown in FIG. 32A, and FIG. 33 is a schematic block diagram showing a functional configuration of a control apparatus PC shown in FIG. 32A.

A conventional communication system shown in FIG. 32A is constituted by comprising the followings:

(a) a local terminal apparatus PA connected with a predetermined local network LN1;

(b) a remote terminal apparatus PB connected with an external network EN1 such as the Internet of an open network or the like, and (c) the control apparatus PC connected with both of the local network LN1 and the external network EN1.

The control apparatus PC is provided with a data storage memory M.

Each of the local terminal apparatuses PA is, for example, a fire alarm sensor for disaster prevention including functions of a thermo-detector, a smoke detector and flame detector, and a group of lighting equipments. An acquired status value information of a group of the local terminal apparatuses PA (this information includes, in particular, information having no highest priority emergency such as a temperature value, a status of turning on or off of each lighting equipment) is fetched into the control apparatus PC in accordance with a return request command which is transmitted from the control apparatus PC to a group of the local terminal apparatuses PA, namely, each apparatus of the group of the local terminal apparatuses PA returns an answer signal to the control apparatus PC via the local network LN1, in response to a request signal for status monitor which is transmitted from the control apparatus PC to each local terminal apparatus PA.

The operation of the control apparatus PC will be further described below with reference to FIG. 33. In the control apparatus PC, when status value information is fetched into an interface PC1 connected with the local network LN1, a packet analyzer section PC2 analyzes a signal including the status value information according to a predetermined protocol of the local network LN1 so as to read the status value information. Thereafter, a data updating section PC3 writes the status value information into the data storage memory M as new data. Namely, the control apparatus PC stores the fetched status value information into the data storage memory M. The storing operation is substantially periodically carried out although it depends upon a degree of traffic congestion in communication between the control apparatus PC and each local terminal apparatus PA, and then, the status value information stored in the data storage memory M is updated every communication therebetween. In this case, the data storage memory M is provided for storing data of the status value information in preparation for a request signal from the remote terminal apparatus PB, and is not an apparatus functioning as a buffer memory for decoding a signal received by the control apparatus PC.

In the case of reading the status value information of each of local terminal apparatuses PA, the remote terminal apparatus PB makes an access to the control apparatus PC via the external network EN1, and then, reads out the status value information of each of the local terminal apparatuses PA from the data storage memory M of the control apparatus PC.

Referring now to FIG. 33, in the control apparatus PC, a packet analyzer section PC5 analyzes an external data received by the interface PC 4 connected with the external network EN1. Then, if the external data is a request signal for status value information from the remote terminal apparatus PB, a data reading section PC6 reads the status value information stored in the data storage memory M. Then, a packet generator section PC7 converts the status value information into an answer signal in a form of a data format capable of transmitting to the remote terminal apparatus PB, and thereafter, the packet generator section PC7 returns the answer signal to the remote terminal apparatus PB via an interface PC4.

FIG. 34 is a schematic block diagram showing a configuration of another conventional communication system, and FIG. 34 shows a system for apartment house or multiple dwelling houses and its peripheral unit arrangement.

Referring to FIG. 34, the apartment house system S1 is constituted by comprising an entryphone S11 provided in each dwelling unit, a door phone S12 mainly provided at the entrance of each dwelling unit, a facility input terminal S13, a lobby entryphone S14, and an alarm supervisory apparatus S15. More specifically, the equipment input terminal S13 is used for inputting setting information of the water supply and drainage facility and for inputting setting information for lighting equipment management and going in-and-out management of a common area facility such as a lobby or the like. The lobby entryphone S14 is provided in a common area such as a lobby, and is used for temporarily answering to a visitor and giving a permission of going in and out of the building. The alarm supervisory apparatus S15 is connected with the entryphone S11, the equipment input terminal S13 and the lobby entryphone S14, and is used as a host machine in the apartment house system S1. Further, the alarm supervisory apparatus S15 is connected with a service center of security company so as to make a contact with there using a dedicated telephone line TEL1 via a communication apparatus S16.

Moreover, in addition to the above apartment house system S1, a service system S2 connected with an electric power company, a gas company and the Waterworks Bureau is also employed. A supervisory input apparatus S21 makes a check for a quantity of used electricity, gas and water of each dwelling unit so as to supervise a used quantity of them, and then, periodically informs a quantity of used source of each dwelling unit to the power company, a gas company and the Waterworks Bureau at the end of month, respectively. By this arrangement, the power company, the gas company and the Waterworks Bureau have no need of carrying out meter reading for each dwelling unit, and merely send an account to each dwelling unit. Therefore, there is no need of sending a meter reading person, so that a labor cost can be reduced.

Further, in the example shown in FIG. 34, a home delivery service system S3 is employed together with the apartment house system S1 and the service system S2 connected with then electric power company, the gas company and the Waterworks Bureau. For example, in an apartment house, a home delivery service box S31 is used as a home mailbox previously allocated to each dwelling unit. The delivery service box S31 is provided with sensors such as a weighting sensor, an infrared sensor and a tilt angle sensor, capable of identifying the presence of baggage. Further, the delivery service box S31 has a sensing function for obtaining such confirmation as whether or not a delivered good is taken out and its takeout time and the like after the delivered good is put into the home delivery service box S31 by a delivery service provider. The status information acquired by these sensors is readable from a management company such as a home delivery service box manufacturer using a dedicated telephone line TEL3.

However, in the conventional communication system shown in FIGS. 32A, 32B and 33, the status value information acquired by the local terminal apparatuses PA is stored in the data storage memory M, and further, the status value information returned in accordance with a request signal from the remote terminal apparatus PB is information which has been already stored in the data storage memory M. For this reason, the status value information is lack of freshness, that is, reliability of being real time information. Therefore, the above conventional communication system is unsuitable in the case of obtaining the latest status value information as much as possible.

Moreover, the control apparatus PC must be necessarily provided with the data storage memory M. In addition, the construction is employed such that the status value information is stored in the data storage memory M. For this reason, when the number of local terminal apparatuses PA and a quantity of data increase, the data storage memory M needs to have a large capacity, and this leads to such a problem that the data storage memory M must be made so as to have a large scale.

On the other hand, in another conventional communication system shown in FIG. 34, the dedicated contracted telephone lines TEL1, TEL2 and TEL3 are independently used with respect to the apartment house system S1, the service system S2 connected with the electric power company, the gas company and the Waterworks Bureau and the home delivery service system S3, respectively. For this reason, the telephone line is required with respect to each of these systems S1 to S3, and this leads to high communication cost.

In the apartment house system S1, although an emergency message is given to a predetermined contracted place such as a security company service center, the contracted company can not perform supervision and setup for control information from the outside of the apartment house system S1 in the light of privacy protection.

SUMMARY OF THE INVENTION

An essential object of the present invention is therefore to provide a communication system, which can achieve miniaturization and cost reduction of control apparatus, and can fetch a status of predetermined processing of a local terminal apparatus in a real time, and further, can know information obtained from an answer signal, such as the status of the predetermined processing on the side of the remote terminal apparatus.

In order to achieve the aforementioned objective, according to one aspect of the present invention, there is provided a communication system comprising:

a local terminal apparatus connected with a local network provided in a predetermined facility;

a remote terminal apparatus connected with an external network; and a control apparatus interposed between the local network and the external network, wherein the local terminal apparatus comprises:

processing executing means for executing a predetermined processing; and reply means for returning an answer signal including a status information of the processing executing means via the local network in response to a request signal received via the local network;

wherein the remote terminal apparatus comprises:

input means for inputting a predetermined operation;

transceiver means for transmitting the request signal including control information corresponding to an operation inputted by the input means via the external network, and receiving an answer signal corresponding to the request signal via the local network; and information output means for outputting the status information included in the answer signal received by the transceiver means, and wherein the control apparatus comprises:

gateway means for receiving the request signal transmitted from the remote terminal apparatus via the external network, and thereafter, transmitting the received request signal to the local terminal apparatus via the local network, and for receiving an answer signal corresponding to the request signal from the local terminal apparatus via the local network, and thereafter, transmitting the received answer signal to the remote terminal apparatus via the external network.

In the above-mentioned communication system, the local terminal apparatus preferably comprises an electric power load apparatus, wherein the processing executing means controls the electric power load apparatus so as to selectively change over a load control status thereof, and wherein the reply means returns the answer signal including status information of the load control status selectively changed over by the processing executing means in response to the request signal.

In the above-mentioned communication system, the local terminal apparatus preferably comprises a supervised apparatus, wherein the processing executing means executes processing for supervising the supervised apparatus, and wherein the reply means returns the answer signal including status information of the supervised apparatus supervised by the processing executing means.

In the above-mentioned communication system, the external network is preferably the Internet.

In the above-mentioned communication system, the remote terminal apparatus is preferably provided in a management center.

The above-mentioned communication system preferably comprises a plurality of local terminal apparatuses and a plurality of remote terminal apparatuses, wherein the control apparatus comprises storage means for storing a transmission destination table including a transmission destination indicative of which one of the plurality of remote terminal apparatuses the answer signal should be transmitted to, for each of the local terminal apparatus, and wherein the gateway means transmits the received answer signal to the remote terminal apparatus determined by referring to the transmission destination table stored in the storage means, via the external network.

The above-mentioned communication system preferably comprises a plurality of local terminal apparatuses and a plurality of remote terminal apparatuses, wherein the control apparatus comprises storage means for storing a transmission destination table including a transmission destination indicative of which one of the plurality of remote terminal apparatuses the answer signal should be transmitted to, for each of the local terminal apparatus and for each status information of the received answer signal, and wherein the gateway means transmits the received answer signal to the remote terminal apparatus determined by referring to the transmission destination table stored in the storage means, via the external network.

In the above-mentioned communication system preferably comprises a plurality of local terminal apparatuses and a plurality of remote terminal apparatuses, wherein each of the local terminal apparatuses comprises storage means for storing a transmission destination table including a transmission destination indicative of which one of the plurality of remote terminal apparatuses the answer signal should be transmitted to, and wherein the reply means transmits the answer signal to be transmitted to the remote terminal apparatus determined by referring to the transmission destination table stored in the storage means, via the local network, the control apparatus and the external network.

The above-mentioned communication system preferably comprises a plurality of local terminal apparatuses and a plurality of remote terminal apparatuses, wherein each of the local terminal apparatuses comprises storage means for storing a transmission destination table including a transmission destination indicative of which one of the plurality of remote terminal apparatuses the answer signal should be transmitted to, in accordance to the status information of the answer signal, and wherein the reply means transmits the answer signal to be transmitted to the remote terminal apparatus determined by referring to the transmission destination table stored in the storage means, via the local network, the control apparatus and the external network.

The above-mentioned communication system preferably comprises a plurality of local terminal apparatuses and a plurality of remote terminal apparatuses, wherein each of the remote terminal apparatuses comprises storage means for storing a transmission destination table including a transmission destination indicative of which one of the plurality of remote terminal apparatuses the answer signal corresponding to the request signal should be transmitted to, wherein the transceiver means transmits via the external network the request signal further including a transmission destination information of the answer signal corresponding to the request signal, the transmission destination information being indicated by the transmission destination table stored in the storage means, and wherein the reply means transmits the answer signal to be transmitted to the remote terminal apparatus indicated by the transmission destination information included in the request signal, via the local network, the control apparatus and the external network.

The above-mentioned communication system preferably comprises a plurality of local terminal apparatuses and a plurality of remote terminal apparatuses, wherein each of the remote terminal apparatuses comprises storage means for storing a transmission destination table including a transmission destination indicative of which one of the plurality of remote terminal apparatuses the answer signal corresponding to the request signal should be transmitted to, in accordance to the status information of the answer signal, wherein the transceiver means transmits via the external network the request signal further including a transmission destination information of the answer signal corresponding to the request signal, the transmission destination information being indicated by the transmission destination table stored in the storage means, and wherein the reply means transmits the answer signal to be transmitted to the remote terminal apparatus, which is indicated by the transmission destination information included in the request signal and which corresponds to status information of the answer signal, via the local network, the control apparatus and the external network.

In the above-mentioned communication system, the local terminal apparatus preferably comprises an electric power consuming apparatus for consuming a commercial electric power, wherein the processing executing means measures an electric power consumption of the electric power consuming apparatus, and wherein the reply means returns the answer signal including information of the measured electric power consumption in response to the request signal.

In the above-mentioned communication system, the processing executing means preferably supervises a disaster status of the facility, and wherein the reply means returns the answer signal including information of the supervised disaster status in response to the request signal.

In the above-mentioned communication system, the local terminal apparatus preferably comprises a lighting equipment, wherein the processing executing means executes processing for selectively changing over an operating status of the lighting equipment, and wherein the reply means returns the answer signal including information of the operating status of the lighting equipment selectively changed over by the processing executing means, in response to the request signal.

In the above-mentioned communication system, the processing executing means preferably measures measurement vales of meteorological observation, and wherein the reply means returns the answer signal including information of the measurement values measured by the processing executing means, in response to the request signal.

In the above-mentioned communication system, the processing executing means preferably detects multi-media information including image and voice signals, and wherein the reply means returns the answer signal including the multi-media information detected by the processing executing means, in response to the request signal.

In the above-mentioned communication system, the processing executing means preferably detects human body information, and wherein the reply means returns the answer signal including the human body information detected by the processing executing means, in response to the request signal.

In the above-mentioned communication system, the local terminal apparatus preferably comprises a home delivery service box, wherein the processing executing means detects a status of the home delivery service box, and wherein the reply means returns the answer signal including the status of the home delivery service box detected by the processing executing means in response to the request signal.

The above-mentioned communication system preferably comprises a plurality of local terminal apparatuses, wherein a part of the plurality of the local terminal apparatuses is provided in a personal space of the facility, and the other part thereof is provided in a common area space of the facility.

In the above-mentioned communication system, the facility preferably includes at least one of an office, a store and an apartment house, and wherein the control apparatus is one of a supervisory control panel and a lobby entryphone integrated with a controller.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 1A is a schematic block diagram showing a configuration of a communication system according to a first preferred embodiment of the present invention;

FIG. 1B is a schematic diagram showing a signal flow in the communication system shown in FIG. 1A;

FIG. 2 is a schematic block diagram showing a configuration of a communication system according to a first modified preferred embodiment of the present invention;

FIG. 3 is a schematic block diagram showing a configuration of a communication system according to a second modified preferred embodiment of the present invention;

FIG. 4 is a schematic block diagram showing a functional configuration of a control apparatus C1 according to the first preferred embodiment;

FIG. 24 is a view showing a transmission destination table for answer signal which is stored in a destination table memory C106 shown in FIG. 23;

FIG. 25 is a view showing a transmission destination table for answer signal of a modified preferred embodiment of the sixteenth preferred embodiment;

FIG. 26 is a schematic block diagram showing a configuration of a communication system according to a seventeenth preferred embodiment of the present invention;

FIG. 27 is a view showing a transmission destination table for answer signal which is stored in a destination table memory A151 of a local terminal apparatus A1 shown in FIG. 26;

FIG. 28 is a view showing a transmission destination table for answer signal of a modified preferred embodiment of the seventeenth preferred embodiment;

FIG. 29 is a schematic block diagram showing a configuration of a communication system according to an eighteenth preferred embodiment of the present invention;

DETAILED DESCRIPTION OF THE PREFERRED EMBODIMENTS

Figure 5:
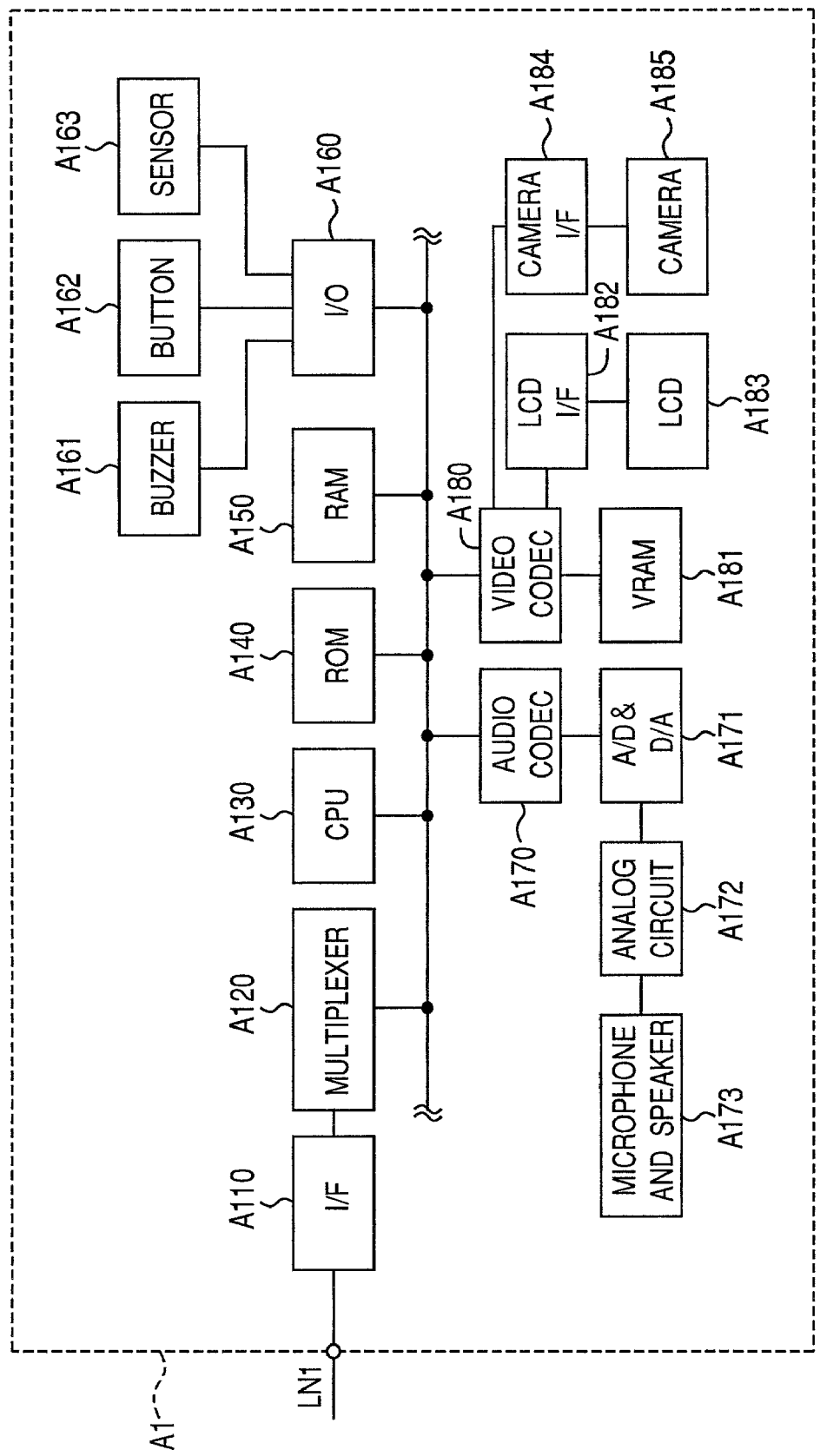
FIG. 5 is a schematic block diagram showing a detailed configuration of a local terminal apparatus A1 according to the first preferred embodiment.

Preferred embodiments according to the present invention will be described below with reference to the attached drawings.

First Preferred Embodiment

FIG. 1A is a schematic block diagram showing a configuration of a communication system according to a first preferred embodiment of the present invention, and FIG. 1B is a schematic diagram showing a signal flow in the communication system shown in FIG. 1A. The first preferred embodiment will be described below with reference to FIGS. 1A and 1B.

The communication system shown in FIG. 1A is constituted by comprising a plurality of local terminal apparatuses A, a remote terminal apparatus B, and a control apparatus C. More specifically, the plurality of local terminal apparatuses A are connected with a predetermined local network LN1. The remote terminal apparatus B is connected with an external network EN1 such as a public network including a radio system network such as a mobile or cellular telephone network, the Internet of an open network or the like. The control apparatus C is interposed between the local network LN1 and the external network EN1.

The local terminal apparatus A including processing executing means performs control and supervision for an electric power load, and performs a processing of a predetermined function such as a load control function or supervisory function for the electric power load control or supervision. Further, as shown in FIG. 1B, the local terminal apparatus A has a reception and return function. More specifically, the local terminal apparatus A receives a request signal Req from the local network LN1, and then, if the request signal Req is provided for the local terminal apparatus A, the local terminal apparatus A returns status information of the above-mentioned predetermined function or processing as an answer signal Ans in accordance with the request signal Req according to a protocol via the local network LN1. In this case, for example, if the predetermined function is a load control function, the local terminal apparatus A makes a changeover of the electric power load control by the load control function into a setup corresponding to the request signal Req with respect to the local terminal apparatus A. A load control status information after this changeover is outputted as an answer signal Ans. On the other hand, if the predetermined function is a supervisory function, the local terminal apparatus A outputs supervisory status information of the supervisory function as an answer signal Ans in accordance with the request signal Req for the local terminal apparatus A.

The remote terminal apparatus B is a mobile or cellular telephone or a computer such as a personal computer, which can connect to the external network EN1. Further, the remote terminal apparatus B has an operation input function, a receiver and transmitter function, and an information output function. More specifically, the operation input function is used for inputting a predetermined operation using input means such as a keypad, a keyboard or the like. The receiver and transmitter function is used for transmitting a request signal Req corresponding to an operation inputted by the operation input function according to a protocol via the external network EN1, and receiving an answer signal Ans to the request signal Req from the external network EN1 according to the protocol. The information output function is used for outputting information obtained from the answer signal Ans received by the receiver and transmitter function.

The control apparatus C performs a signal transfer between the remote terminal apparatus B and the local terminal apparatus A, and has a gateway function. More specifically, according to the gateway function, the control apparatus C receives a request signal Req transmitted from the remote terminal apparatus B according to a protocol via the external network EN1, and then, transmits the request signal Req to the corresponding local terminal apparatus A according to the protocol by a command corresponding to the request signal Req via the local network LN1. Further, the control apparatus C receives an answer signal Ans corresponding to the above request signal Req returned according to the protocol via the local network LN1 from the local terminal apparatus A, and then, transmits the answer signal Ans to the remote terminal apparatus B according to the protocol via the external network EN1.

Next, the following is a description on an operation, which is a constituent feature of the first preferred embodiment. When a predetermined operation is carried out using the operation input function of the remote terminal apparatus B, the remote terminal apparatus B transmits a request signal Req corresponding to the above operation to the control apparatus C according to the protocol via the external network EN1. When the request signal Req from the remote terminal apparatus B is received by the control apparatus C, the request signal Req is transmitted to the local terminal apparatus A corresponding to the received request signal Req by a command corresponding to the request signal Req via the local network LN1 according to the protocol thereof. Then, when receiving the request signal Req from the control apparatus C is received by the local terminal apparatus A, if the received request signal Req is a request signal to the local terminal apparatus A, status information of the predetermined function is returned as an answer signal Ans corresponding to the request signal Req to the control apparatus C via the local network LN1 according to the protocol thereof. Further, when the answer signal Ans from the local terminal apparatus A is received by the control apparatus C, the received answer signal Ans is transmitted to the remote terminal apparatus B via the external network EN1 according to the protocol thereof. Further, when the answer signal Ans from the control apparatus C is received by the remote terminal apparatus B, the status information obtained or extracted from the answer signal Ans is outputted using the information output function of the remote terminal apparatus B.

It is to be noted that the request signal Req includes name information of originating transmitter, name information of destination, and information data, where the information data includes status information.

In this case, the status information of the predetermined function of the local terminal apparatus A is fetched in the remote terminal apparatus B in a real time. In addition, it is possible to know the status information obtained from the answer signal Ans, that is, the status information of the predetermined function via the information output function of the remote terminal apparatus B. Moreover, the control apparatus C has no need of providing any memory for storing the status information of the predetermined function of the local terminal apparatus A, and therefore, the control apparatus C can be made into a small size, and a cost reduction can be achieved.

Next, the following is a description on an operation in the case where the predetermined function of the local terminal apparatus A is a load control function. When a predetermined operation is carried out using the operation input function of the remote terminal apparatus B, a request signal Req corresponding to the above operation is transmitted to the control apparatus C via the external network EN1 according to the protocol thereof by the remote terminal apparatus B. When the request signal Req from the remote terminal apparatus B is received by the control apparatus C, the received request signal Req is transmitted to the local terminal apparatus A corresponding to the received request signal Req by the corresponding command via the local network LN1 according to the protocol thereof. Then, when the request signal Req from the control apparatus C is received by the local terminal apparatus A, if the request signal Req is a request to the local terminal apparatus A, a load control by the load control function is changed into a setup corresponding to the received request signal Req.

Thereafter, by the local terminal apparatus A, the load control status information after changeover is returned as an answer signal Ans to the control apparatus C via the local network LN1 according to the protocol of the local network. Then, when the answer signal Ans from the local terminal apparatus A is received by the control apparatus C, the answer signal Ans is returned to the remote terminal apparatus B via the external network EN1 according to the protocol thereof. Further, when the answer signal Ans from the control apparatus C is received by the remote terminal apparatus B, the status information obtained from the answer signal Ans is outputted using the information output function of the remote terminal apparatus B.

In this case, by the remote terminal apparatus B, it is possible to perform a remote control for a desired local terminal apparatus A, and to confirm the load control status of the local terminal apparatus A after the changeover.

Next, the following is a description on an operation in the case where the predetermined function of the local terminal apparatus A is a supervisory function. When a predetermined supervisory confirmation operation is carried out using the operation input function of the remote terminal apparatus B, a request signal Req corresponding to the above operation is transmitted to the control apparatus C via the external network EN1 according to the protocol thereof by the remote terminal apparatus B. When the request signal Req from the remote terminal apparatus B is received by the control apparatus C, the received request signal Req is transmitted to the local terminal apparatus A corresponding to the received request signal Req by the corresponding command via the local network LN1 according to the protocol thereof. Then, when the request signal Req from the control apparatus C is received by the local terminal apparatus A, in accordance with the request signal Req, the supervisory status information is returned as an answer signal Ans to the control apparatus C via the local network LN1 according to the protocol thereof. Then, when the answer signal Ans from the local terminal apparatus A is received by the control apparatus C, the answer signal Ans is returned to the remote terminal apparatus B via the external network EN1 according to the protocol thereof. Further, when the answer signal Ans from the control apparatus C is received by the remote terminal apparatus B, the status information obtained or extracted from the answer signal Ans is outputted using the information output function of the remote terminal apparatus B.

In this case, it is possible to confirm the supervisory status of the supervisory function of a desired local terminal apparatus A by the remote terminal apparatus B.

As described above, according to the first preferred embodiment, it is possible to fetch the status of the predetermined function of the local terminal apparatus A in the remote terminal apparatus B in a real time, and to know the information obtained from the answer, that is, the status of the predetermined function via the information output function of the remote terminal apparatus B. Moreover, the control apparatus C has no need of providing any memory for storing the status information of the predetermined function of the local terminal apparatus A, and therefore, the control apparatus C can be made into a small size, and a cost reduction can be achieved.

Moreover, in the case where the predetermined function is the load control function, remote control for a desired local terminal apparatus A is carried out by the remote terminal apparatus B, and the load control status of the local terminal apparatus A after changeover can be confirmed by the remote terminal apparatus B. In order to give examples of the load control function, in the case where the electric power load is a lighting equipment, lighting control for the lighting equipment is load control, and turning on and off or dimming is load control status information. In the case where the electric power load is a ventilating fan, drive control for the ventilating fan is load control, and stopping or driving of the ventilating fan is load control status information. In the case where the electric power load is an air conditioner, drive control for the air conditioner is load control, and stop, driving or temperature setup of the air conditioner is load control status information. In the case where the electric power load is a power rain shutter door, drive control for the power rain shutter door is load control, and opening or closing of the power rain shutter door is load control status information.

Moreover, in the case where the predetermined function is the supervisory function, a supervisory status of the supervisory function of the local terminal apparatus A can be confirmed by the remote terminal apparatus B. In order to give examples of the supervisory function, in the case where the supervisory function is a smoke detector, a flame detector or a thermo-detector, the detection result of the smoke detector, the flame detector or the thermo-detector is supervisory status information. In the case where the supervisory function is an environmental sensor such as a temperature sensor, a dew condensation sensor, a rainfall sensor or a wind force sensor, the detection result of the environmental sensor is supervisory status information. In the case where the supervisory function is a camera, an image data picked up by the camera is supervisory status information. In the case where the supervisory function is a security sensor, the detection result of the security sensor is supervisory status information. In the case where the supervisory function is a medical sensor such as a weighing machine, a heartbeat meter, a clinical thermometer, a sphygmomanometer, a blood-sugar level meter, or a drip residual monitoring apparatus, the detection result of each medical sensor is supervisory status information. In the case where the supervisory function is a microphone, the status indicated by sound information inputted to the microphone is supervisory status information. In the case where the supervisory function is a sensor, which detects the existence of delivered good in the home delivery service box, the detection result of the sensor is supervisory status information. In the case where the supervisory function is a sensor, which detects opening or closing state of a door, a window or the like, the detection result of the sensor is supervisory status information.

FIG. 2 is a schematic block diagram showing a configuration of a communication system according to a first modified preferred embodiment of the present invention. In FIG. 2, EN denotes the Internet of an external network, and AP denotes an access point.

The above-mentioned first preferred embodiment has such a system configuration that only one remote terminal apparatus B is provided, however, as shown in FIG. 2, such a system configuration may be employed that each of a plurality of local networks LN201 and LN202 is provided with a plurality of remote terminal apparatuses B. In this case, the control apparatus C is connected via an external network EN2 to the plurality of local networks LN201 and LN202.

FIG. 3 is a schematic block diagram showing a configuration of a communication system according to a second modified preferred embodiment of the present invention. In FIG. 3, EN denotes the Internet of an external network, and AP denotes an access point.

The above-mentioned first preferred embodiment has such a system configuration that only one control apparatus C is provided, however, as shown in FIG. 3, such a system configuration may be employed that a plurality of control apparatuses C is provided, and a plurality of local terminal apparatuses A is connected with each of the plurality of control apparatuses C, where the external network EN2 is connected via the control apparatus C to the local network LN101, and is also connected via another control apparatus C to another local network LN102. Further, one control apparatus C may be connected with a plurality of main lines of local networks. In this case, the main line of the local network may be connected respectively in different first layer (physical layer) levels of a so-called OSI model for each main line connected with the control apparatus C.

Figure 6:
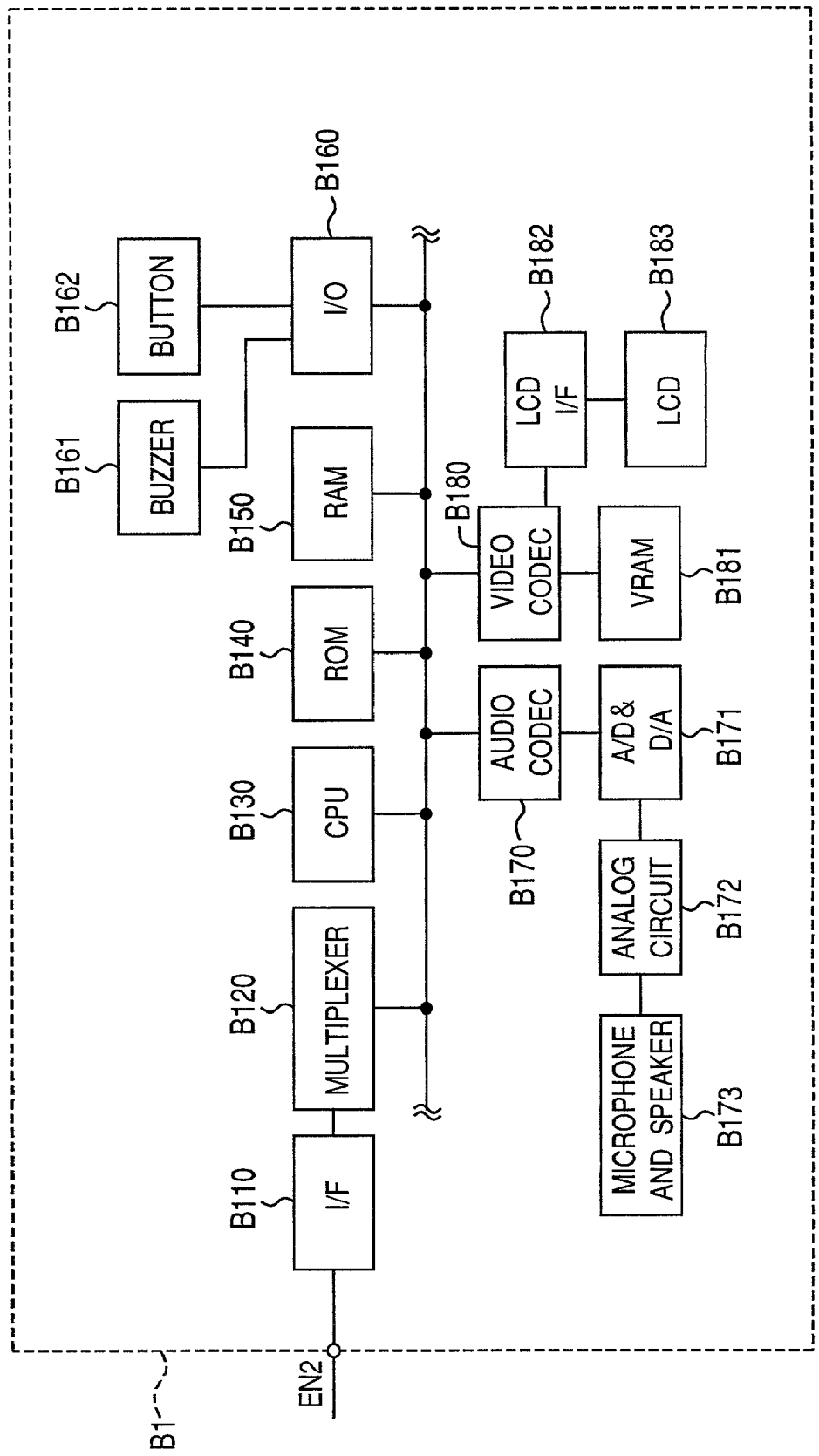
FIG. 6 is a schematic block diagram showing a detailed configuration of a remote terminal apparatus B1 according to the first preferred embodiment.
Figure 7:
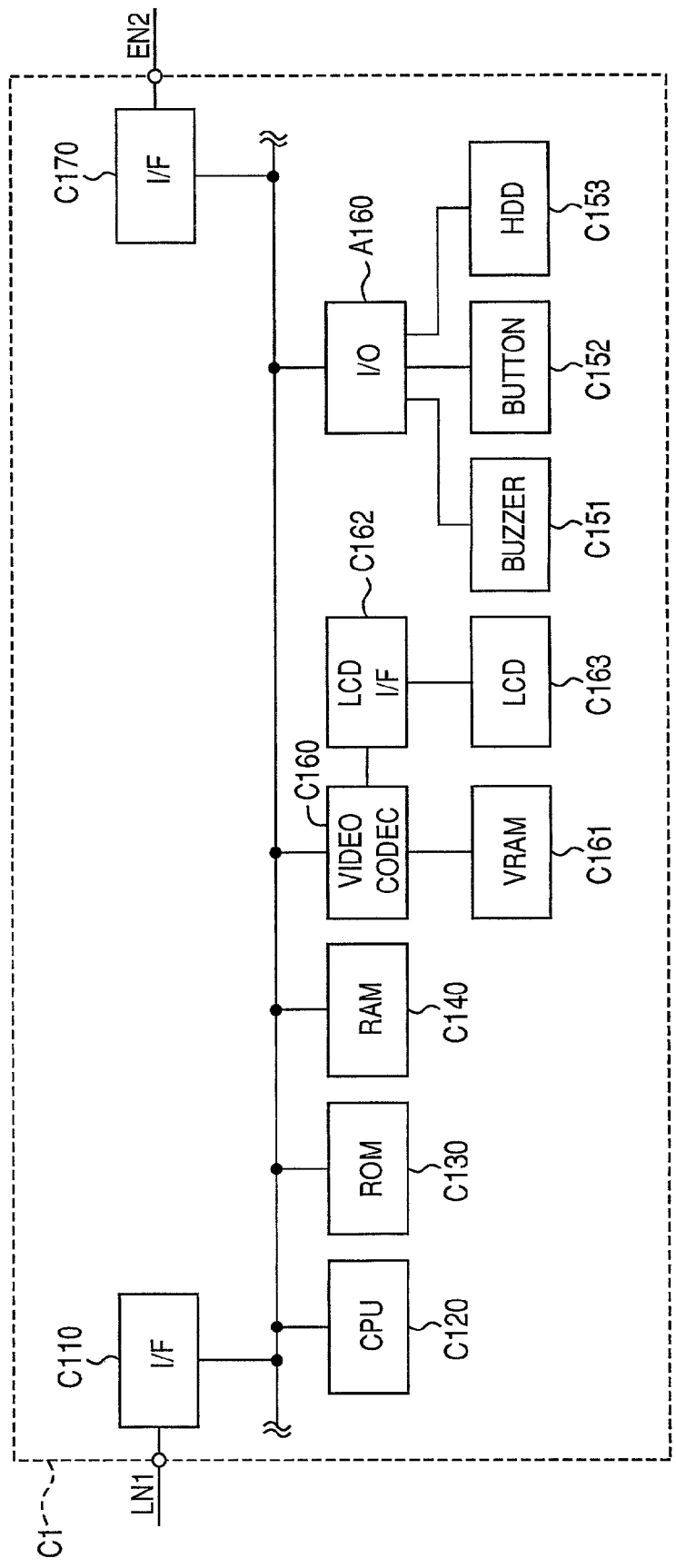
FIG. 7 is a schematic block diagram showing a detailed configuration of the control apparatus C1 according to the first preferred embodiment.

FIG. 4 is a schematic block diagram showing a functional configuration of a control apparatus C1 according to the first preferred embodiment, FIG. 5 is a schematic block diagram showing a detailed configuration of a local terminal apparatus A1 according to the first preferred embodiment, FIG. 6 is a schematic block diagram showing a detailed configuration of a remote terminal apparatus B1 according to the first preferred embodiment, and FIG. 7 is a schematic block diagram showing a detailed configuration of the control apparatus C1 according to the first preferred embodiment. With reference to these FIG. 4 to FIG. 7, the detail of the first preferred embodiment will be described below.

The communication system of the first preferred embodiment comprises a plurality of local terminal apparatuses A1 connected with a predetermined local network LN1, a remote terminal apparatus B1 connected with the Internet EN2, and a control apparatus C1 interposed between the local network LN1 and the Internet EN2. In the communication system of the first preferred embodiment, the Internet EN2 can be used as the external network.

More specifically, the control apparatus C1 can be connected with the remote terminal apparatus B1 using an Internet protocol. In response to reception of a request signal for transmission of status value information, which is information indicating a status of the predetermined function, from the remote terminal apparatus B1, the control apparatus C1 establishes a communication handshake with each of the plurality of local terminal apparatuses A1, and then, transfers the above request signal to the corresponding local terminal apparatus A1. Further, when receiving the latest status value information as an answer signal in accordance with the request signal, the control apparatus C1 returns the latest status value information to the remote terminal apparatus B1 by using the gateway function.

Now, the above gateway function will be described below in detail. As shown in FIG. 4, a transmission signal from the remote terminal apparatus B1 is collected into one data sequence by a packet analyzer section C102 via an interface C101. In a protocol converter section C103, the data sequence is converted into data for local network communication protocol so as to be able to use in a communication protocol of the local network LN1 by a protocol conversion, and then, the converted data sequence is transmitted as a request signal for returning of the latest status value information to the local terminal apparatus A1 via an interface C104.

When the control apparatus C1 fetches the status value information via the interface C104 connected with the local network LN1, the protocol converter section C103 reads the status value information from data (including status value information) defined at the communication protocol of local network LN1. Thereafter, the protocol converter section C103 converts the status value information into data which can be transmitted according to a so-called Internet protocol such as TCP/IP or the like by the protocol conversion. Then, in the control apparatus C1, a necessary portion of the status value information is converted into data by the protocol converter section C103, and thereafter, the converted data is converted into data in a form of a data packet format which can be transmitted to the remote terminal apparatus B1 by a packet generator section C105. Further, the converted data is returned to the remote terminal apparatus B1 via the interface C101 connected with the Internet EN2.

Next, each configuration of the local terminal apparatus A1, the remote terminal apparatus B1 and the control apparatus C1 will be described below with reference to FIG. 5 to FIG. 7. In examples of a lighting equipment or electric power supervision of FIG. 8 to FIG. 10 which will be described later, all of hardware functions shown in FIG. 5 to FIG. 7 are not used, and necessary hardware functions are properly and selectively used.

Referring to FIG. 5, the local terminal apparatus A1 shown in FIG. 5 includes an interface (I/F) A110 for local network LN1, a signal multiplex/demultiplex circuit (MULTIPLEX) A120 for multiplexing video, voice and control signals to one packet and demultiplexing the multiplexed packet to each of video, voice and control signals, and a central processing unit (CPU) A130. Further, the local terminal apparatus A1 includes a ROM A140 for storing operation programs, a RAM A150 for storing received data (status value information is stored as a temporary data, and besides, data required for communication is temporarily stored, and further, these data are successively deleted after decoding operation and treatment return operation are completed). Further, the local terminal apparatus A1 includes an input/output port (I/O) A160, an alarm sound output buzzer A161, a group of input keys (BUTTON) A162 for inputting an external operation by finger, and a sensor A163 for measuring various physical/chemical quantity of surrounding environment. Further, the local terminal apparatus A1 includes an audio codec A170, which is a sound information code conversion unit, an A/D and D/A converter A171 having an A/D converter function and a D/A converter function, an analog circuit A172 for mainly executing a bi-directional conversion of voice information and an electric signal, and a sound information acquisition/output unit (MICROPHONE AND SPEAKER) A173 such as a microphone, a speaker or the like. Further, the local terminal apparatus A1 includes a video codec A180, which is a video information conversion unit, a video recording VRAM A181, an LCD (liquid crystal display) interface (LCD I/F)

A182 having a display or touch panel input/output interface, a display or touch panel LCD A183, a camera signal transfer interface (CAMERA I/F) A184, and a photograph camera A185.

Referring to FIG. 6, the remote terminal apparatus B1 shown in FIG. 6 includes an interface (I/F) B110 for the Internet EN2 (having both radio and cable systems if the remote terminal apparatus B1 is a mobile terminal, and having a cable system if it is not a mobile terminal, but a cable connecting unit). Further, the remote terminal apparatus B1 includes a signal multiplex/demultiplex circuit (MULTIPLEX) B120 for multiplexing video, voice and control signals to one packet and demultiplexing the multiplexed packet to each of video, voice and control signals, and a central processing unit (CPU) B130. Further, the remote terminal apparatus B1 includes a ROM B140 for storing operation programs, a RAM B150 for storing received data (status value information is stored as temporary data, and besides, data required for communication is temporarily stored, and further, these data are successively deleted after decoding operation and treatment return operation are completed). Further, the remote terminal apparatus A1 includes an input/output port (I/O) B160, an alarm sound output buzzer B161, and a group of input keys (BUTTON) B162 for inputting an external operation by finger. Further, the remote terminal apparatus B1 includes an audio codec B170, which is a sound information code conversion unit, an A/D and D/A converter B171 having an A/D converter function and a D/A converter function, an analog circuit B172 for mainly executing a bi-directional conversion of voice information and an electric signal, and a sound information acquisition/output unit (microphone and speaker) B173 such as a microphone, a speaker or the like. Further, the remote terminal apparatus B1 includes a video codec B180, which is a video information conversion unit B180, a video recording VRAM B181, an LCD (liquid crystal display) interface (LCD I/F) B182 having a display or touch panel input/output interface, and a display or touch panel LCD B183.

Referring to FIG. 7, the control apparatus C1 shown in FIG. 7 includes an interface (I/F) C110 for local network LN1, a central processing unit (CPU) C120, a ROM C130 for storing operation programs, a RAM C140 for storing received data (status value information is stored as temporary data, and besides, data required for communication is temporarily stored). Further, the control apparatus C1 includes an input/output port (I/O) C150, an alarm sound output buzzer C151, a group of input keys (button) C152 for inputting an external operation by finger, and a hard disk drive (HDD) C153 for periodically backing up at least log file in preparation for a generation of trouble on communication or operation. Further, the control apparatus C1 includes a video codec C160, which is a video information decoder unit, a video recording VRAM C161, an LCD (liquid crystal display) interface (LCD I/F) C162 having a display or touch panel input/output interface, a display or touch panel LCD C163, and an interface (I/F) C170 for the Internet EN2.

Second Preferred Embodiment

Figure 8:
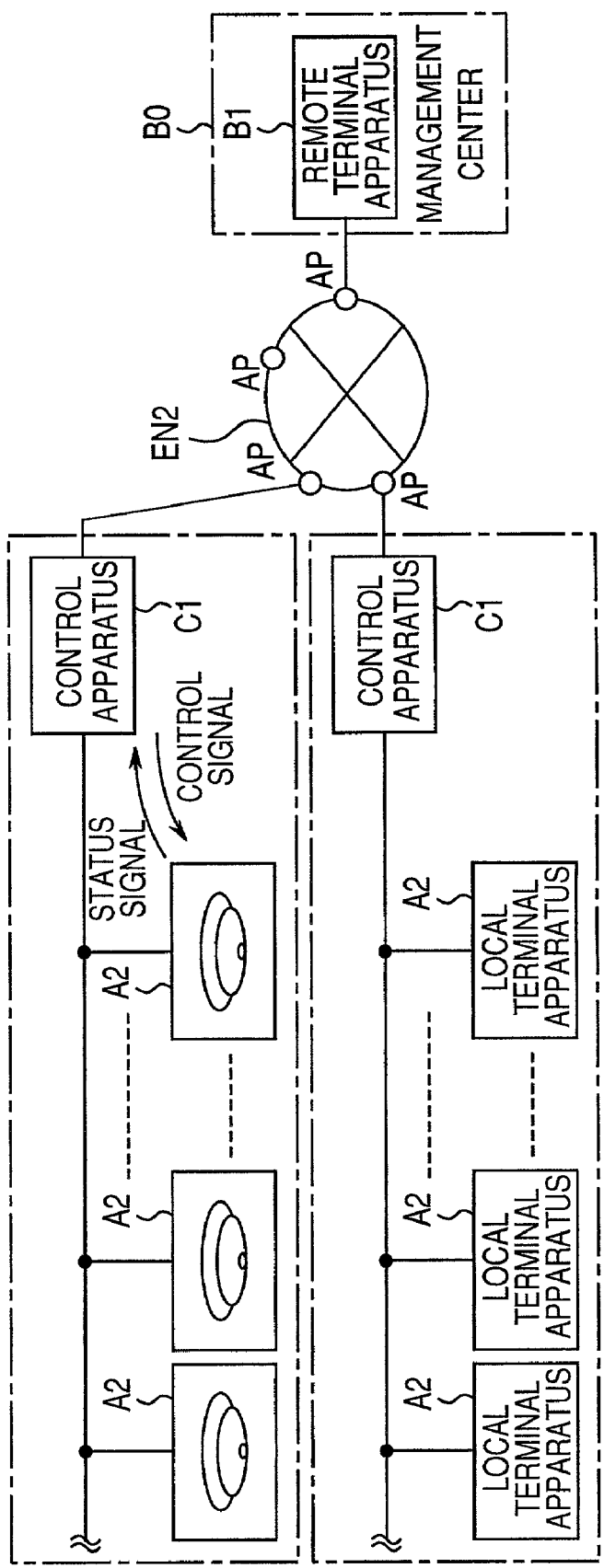
FIG. 8 is a schematic block diagram showing a configuration of a communication system according to a second preferred embodiment of the present invention.

FIG. 8 is a schematic block diagram showing a configuration of a communication system according to a second preferred embodiment of the present invention. With reference to FIG. 8, the communication system of the second preferred embodiment comprising the above-mentioned local terminal apparatus A1, remote terminal apparatus B1 and control apparatus C1 will be described below.

The communication system shown in FIG. 8 is provided with a local terminal apparatus (hereinafter, a reference numeral A2 is used) for carrying out a load control of lighting equipment of an electric power load apparatus. The remote terminal apparatus B1 is installed in a management center B0 for carrying out a lighting management. In this case, the local terminal apparatus A2 belongs to a type of remote control lighting equipment whose address is set by a mobile remote control setting communication apparatus or remote control apparatus.

In this case, the control apparatus C1 can be connected with the remote terminal apparatus B1 of the management center B0 using an Internet protocol. When receiving a request signal for transmission of status value information from the remote terminal apparatus B1, the control apparatus C1 establishes a communication handshake with a plurality of local terminal apparatuses A2, and then, makes a request for returning of the latest status value information (in this case, See the following information) with respect to the corresponding local terminal apparatus A2. For example, the above information includes: information that a lighting equipment is now being turned on; information that the lighting equipment is now being turned off; information whether or not a fluorescent lamp or lamp bulb has still a sufficient lifetime in view of its power consumption, and is burned out, lighting control level; a lighting control pattern such as a time interval of turn on and off; information which group number the lighting equipment belongs to if it is a group control object, and information on which floor the lighting equipment is arranged, and which it is arranged at a wall surface or is embedded in a floor. In response to the request for returning thereof, the control apparatus C1 returns the latest value information received from the corresponding local terminal apparatus A2 to the management center B0 using the gateway function.

With reference to FIGS. 4 and 7, the above gateway function will be described below. A transmission signal from the management center B0 is made into one data sequence collected by the packet analyzer section C102 via the interface C101 (equivalent to C120, C130 and C140 in FIG. 7). Thereafter, the transmission signal is converted into data by the protocol converter section C103 according to a communication protocol of the local network LN1, and then, the converted data is transmitted as a request signal for status value information to the local terminal apparatus A2 via the interface C104.

When fetching the status value information via the interface C104 connected with the local network LN1, the control apparatus C1 reads or extracts the status value information from the data (including status value information) defined by the communication protocol of the local network LN1 in the protocol converter section C103 (equivalent to C120 and C130 in FIG. 7). Thereafter, data of the status value information is converted into data which can be transmitted according to an Internet protocol such as TCP/IP or the like, and then, in the protocol converter section C103, a necessary portion of the status value information is converted into data. Thereafter, the data thus converted is converted into a packet having data format which can be transmitted to the management center B0 by the packet generator section C105 (equivalent to C120 and C130 in FIG. 7), and then, the converted packet is returned to the management center B0 via the interface C101 (equivalent to C170 in FIG. 7) connected with the Internet EN2.

Third Preferred Embodiment

Figure 9:
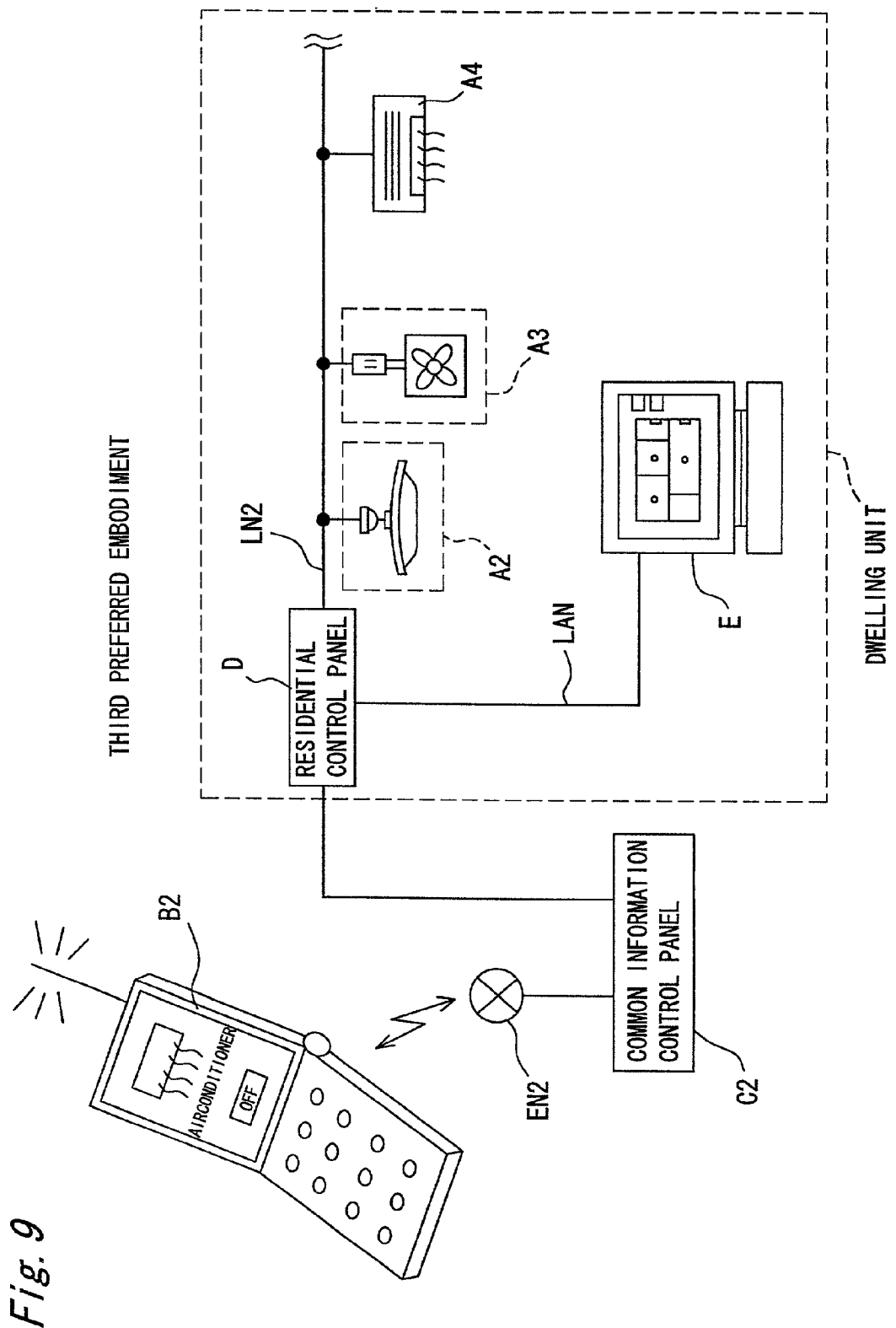
FIG. 9 is a schematic block diagram showing a configuration of a communication system according to a third preferred embodiment of the present invention.

FIG. 9 is a schematic block diagram showing a configuration of a communication system according to a third preferred embodiment of the present invention. Next, another communication system will be described below with reference to FIG. 9.

In the communication system shown in FIG. 9, the control apparatus is provided as a common information control panel (hereinafter, referred to as common information control panel C2) including a control apparatus. Moreover, a remote terminal apparatus (hereinafter, a reference numeral B2 is used) comprising a predetermined mobile terminal is used. The remote terminal apparatus B2 has a function of displaying a status value information of a group of local terminal apparatuses using an icon in addition to an ordinary mobile terminal function.

A group of local terminal apparatuses includes a local terminal apparatus A3 in which a ventilating fan is set as an electric power load and a local terminal apparatus A4 in which an air conditioner is set as an electric power load, in addition to the local terminal apparatus A2. In this case, as the status value information of the local terminal apparatus A3, there is provided power on/off information. On the other hand, as the status value information of the local terminal apparatus A4, there is provided information such as power on/off, heating/cooling/dehumidifying/air supply, preset temperature, wind force level, wind direction (up, down, left, right, continuous operation), timer control (control by elapsed time, control by time designation).

Moreover, an electric power line in the building is used as a local network (hereinafter, a reference numeral LN2 is used), and a group of local terminal apparatuses is controlled by a residential control panel D for carrying out a power line carrier communication. The residential control panel D is connected with a display apparatus E by a building LAN (local area network). The display apparatus E displays a using status of a group of local terminal apparatuses (displaying power on/off represented by icon flushing time interval, power consumption level, etc.) in align with the layout made in building.

For example, in the case where a person, who has the remote terminal apparatus B2, do not know whether or not the power of local terminal apparatus 4 is turned off after he has gone out, he operates the remote terminal apparatus B2 at the place where he goes out so that the remote terminal apparatus B2 is connected with the Internet EN2. Then, he makes a request for confirming an electric power status of the air conditioner, which is set as an electric load, for the common information control panel C2. By this arrangement, the common information control panel C2 requests a status value information (as to whether power is now turned on or off) relative to the power status with respect to the local terminal apparatus A4 by the power line carrier communication via the residential control panel D in the same manner as that of the above case of FIG. 8. When receiving the status value information signal from the local terminal apparatus A4 via the residential control panel D, the common information control panel C2 transmits the information as to whether the power of the air conditioner is now turned on or off, to the remote terminal apparatus B2 via the Internet EN2. Therefore, he having the remote terminal apparatus B2 can know whether the power of the air conditioner is now turned on or off without going his home.

Incidentally, in the building, he looks at the display apparatus E, and it is possible to know the current using status of a group of local terminal apparatuses.

Fourth Preferred Embodiment

Figure 10:
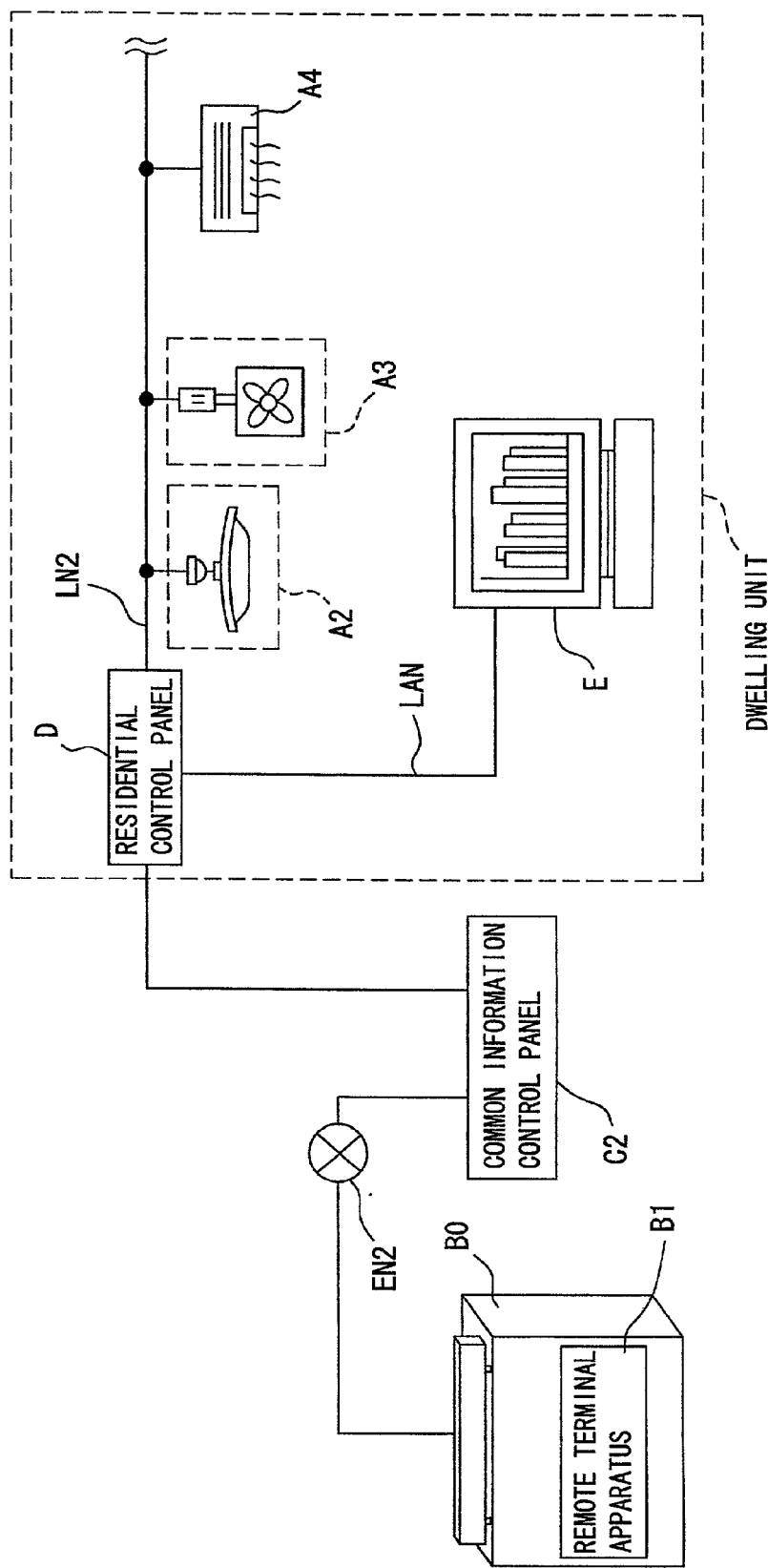
FIG. 10 is a schematic block diagram showing a configuration of a communication system according to a fourth preferred embodiment of the present invention.

FIG. 10 is a schematic block diagram showing a configuration of a communication system according to a fourth preferred embodiment of the present invention. Another communication system will be described below with reference to FIG. 10. In the communication system shown in FIG. 10, a remote terminal apparatus B1 for monitoring power consumption equipments is provided in the management center B0 of the electric power company.

The residential control panel D periodically calculates the amount of power consumption of a group of local terminal apparatuses such as the local terminal apparatus A2 to A4 at a predetermined time unit such as one day, one week, one month or the like. An accumulated amount of power consumption of the group of the local terminal apparatuses is displayed on the display apparatus E, and the display apparatus E is used as a monitor for displaying the amount of power consumption. The common information control panel C2 is connected with the remote terminal apparatus B1 of the management center B0 via the Internet EN2, and the power consumption periodically calculated by the residential control panel D can be reported to the management center B0 of the electric power company via the Internet EN2. More specifically, in accordance with a request signal from the remote terminal apparatus B1 of the management center B0, the residential control panel D calculates the amount of power consumption of the group of the local terminal apparatuses by the timing point, and then, returns an answer signal including the calculated amount of power consumption to the management center B0 via the Internet EN2.

As described above, the latest status value information is obtained by the local terminal apparatus connected with the local network as much as possible. Therefore, it is possible to obtain the status value information in a real time, and to reduce a memory capacity for storing the status value information. As a result, the facility including the equipments can be miniaturized, and in particular, in a technical field of building equipments in which a plurality of rooms of an apartment house or the like is considered as one body, there is no need of providing a plurality of dedicated communication lines with the external network. Therefore, it is possible to reduce an infrastructure cost, and to perform supervision and control information setup from the outside.

Fifth Preferred Embodiment

Figure 11:
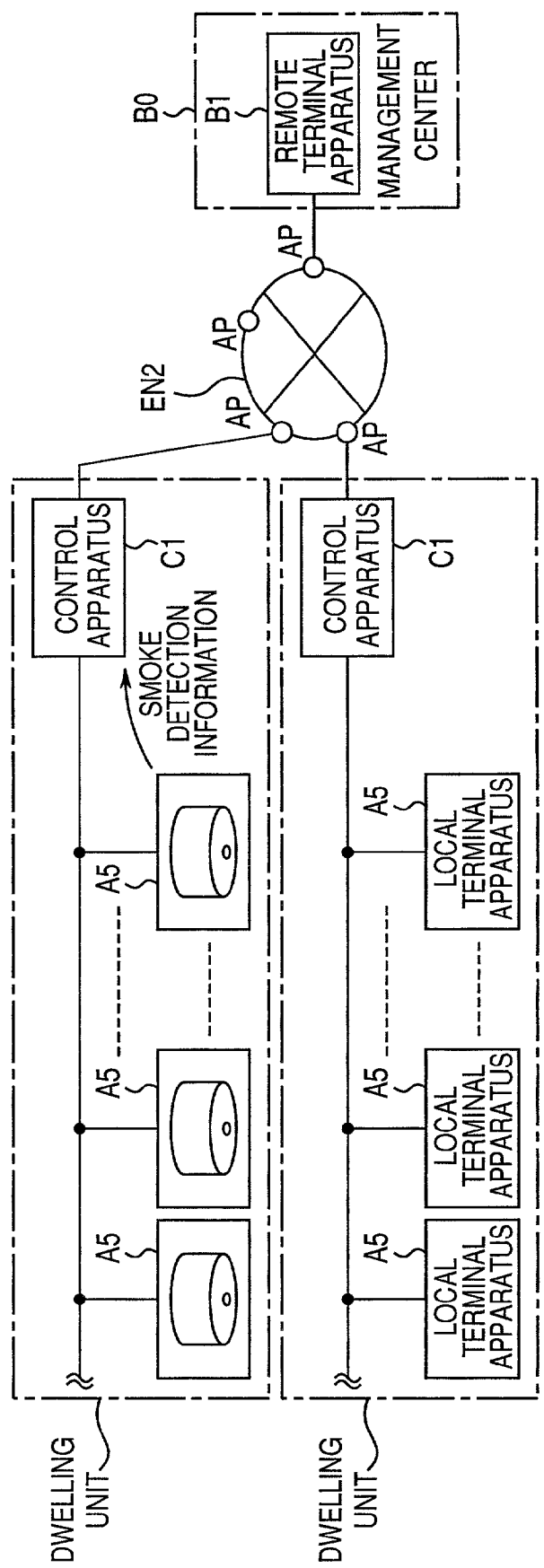
FIG. 11 is a schematic block diagram showing a configuration of a communication system according to a fifth preferred embodiment of the present invention.

FIG. 11 is a schematic block diagram showing a configuration of a communication system according to a fifth preferred embodiment of the present invention. With reference to this FIG. 11, the fifth preferred embodiment will be described below.

In the communication system shown in FIG. 11, each of a plurality of local terminal apparatuses A5 connected with each control apparatus C1 is provided with a sensor for disaster prevention, such as a smoke detector, a flame detector, a thermo-detector or the like, as a supervisory function. Moreover, the remote terminal apparatus B1 is provided in a management center B0 of disaster prevention center.

The communication system of the present fifth preferred embodiment is different from the above second to fourth preferred embodiment at such points that it is constructed as a system for disaster prevention, and not lighting control or power consumption control, and this is a constituent feature of the fifth preferred embodiment. Namely, unlike the above second to fourth preferred embodiment, as the status value information, which is a supervisory status of the supervisory function of the local terminal apparatus A5, the following information is used. More specifically, the status value information includes binary information whether or not each of sensed flame, smoke and heat (per unit time or total measured value) or the amount of sensed flame, smoke and heat reaches a level harmful to human body, binary information whether or not a fire takes place.

In the fifth preferred embodiment, it is possible to confirm a status of the supervisory function of the local terminal apparatus A5 by the remote terminal apparatuses B1 and B2.

In the case of the communication system of FIG. 11, the remote terminal apparatus B1 of the management center B0 is always connected with the Internet EN2 so that the remote terminal apparatus B1 reads the status value information of each local terminal apparatus A5 with a predetermined period, and this leads to that the supervision of disaster prevention is preferably carried out by remote control.

Sixth Preferred Embodiment

Figure 12:
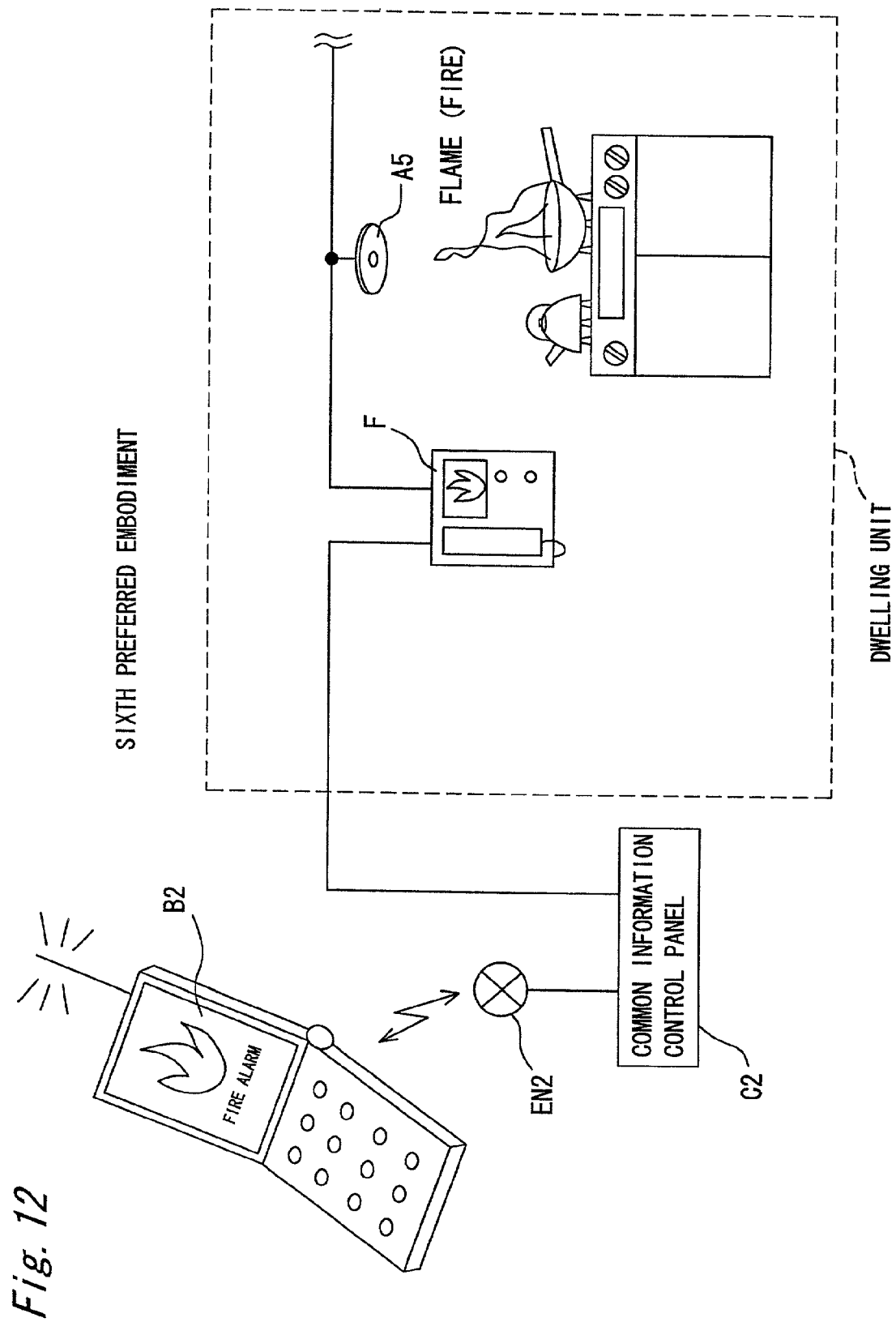
FIG. 12 is a schematic block diagram showing a configuration of a communication system according to a sixth preferred embodiment of the present invention.

FIG. 12 is a schematic block diagram showing a configuration of a communication system according to a sixth preferred embodiment of the present invention.

Referring to FIG. 12, each control apparatus C1 is provided with a residential information equipment, and in each dwelling unit, a mobile (portable) type remote terminal apparatus B2 is used.

In the case of FIG. 12, by a calling apparatus F such as an entryphone with telephone function, the status value information of each local terminal apparatus A5 is read with a predetermined period. In the case where the status value information is information indicative of fire or the like, the calling apparatus F is constructed so as to inform the other party having a previously registered telephone number (phone number of the remote terminal apparatus B2 in FIG. 12) of the fire. By this arrangement, it is possible to know the fire by using the remote terminal apparatus B2 from the place where the user goes out, and thus, to suitably deal with the fire from the remote place. Moreover, in this case, a message "fire takes place, please run away from emergency exit" may be displayed on a display screen of the calling apparatus F.

Seventh Preferred Embodiment

Figure 13:
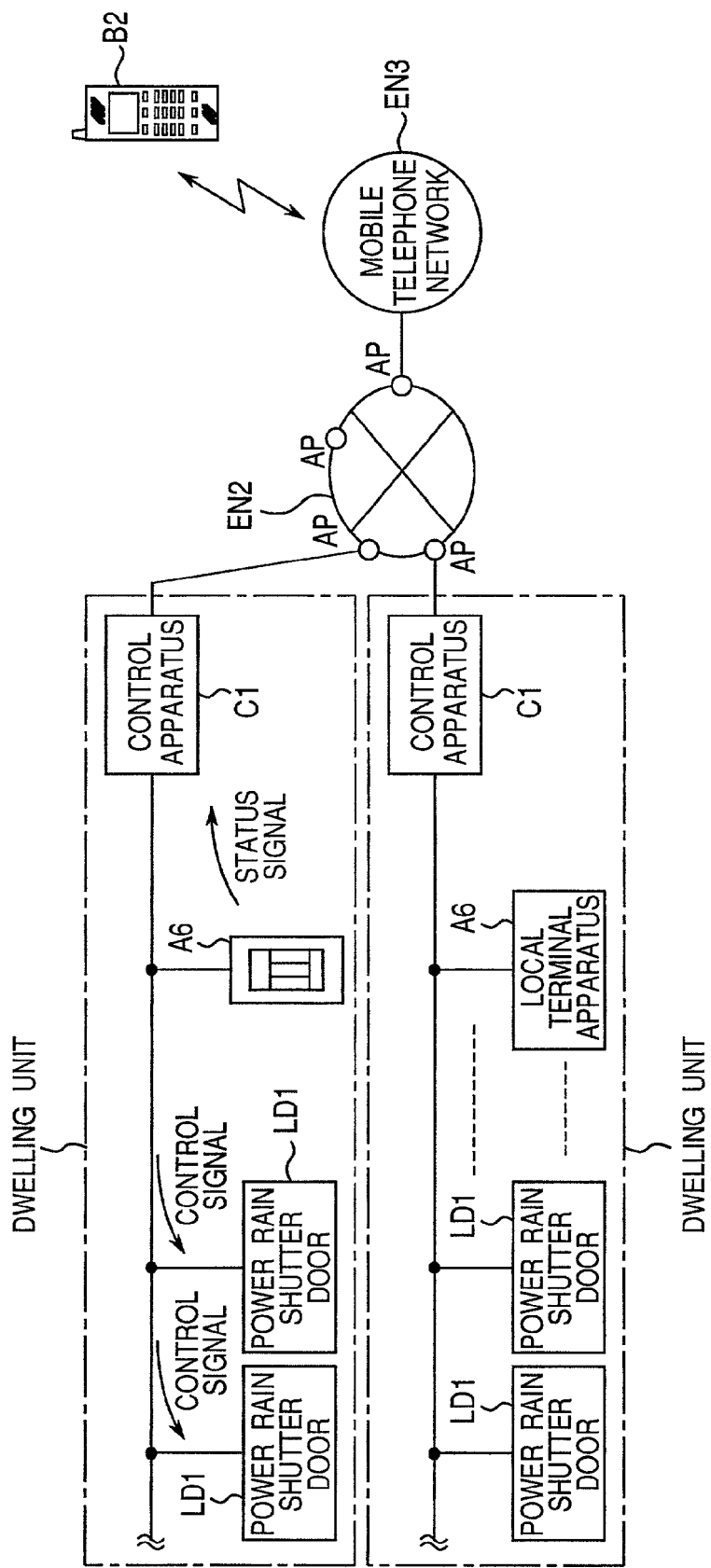
FIG. 13 is a schematic block diagram showing a configuration of a communication system according to a seventh preferred embodiment of the present invention.

FIG. 13 is a schematic block diagram showing a configuration of a communication system according to a seventh preferred embodiment of the present invention. The seventh preferred embodiment will be described below with reference to FIG. 13.

In the communication system shown in FIG. 13, each control apparatus C1 is connected with a local terminal apparatus A6 having a load control function of opening and closing a plurality of power rain shutter doors LD1. Moreover, a mobile (portable) type remote terminal apparatus B2 is used. In FIG. 13, a reference numeral EN3 denotes a mobile (cellular) phone network.

In the seventh preferred embodiment, it is possible to open and close the power rain shutter door LD1 according to remote control by the remote terminal apparatus B2 via the local terminal apparatus A6, and to confirm a load control status of the local terminal apparatus A6 after the changeover of open and close by the remote terminal apparatus B2.

Eighth Preferred Embodiment

Figure 14:
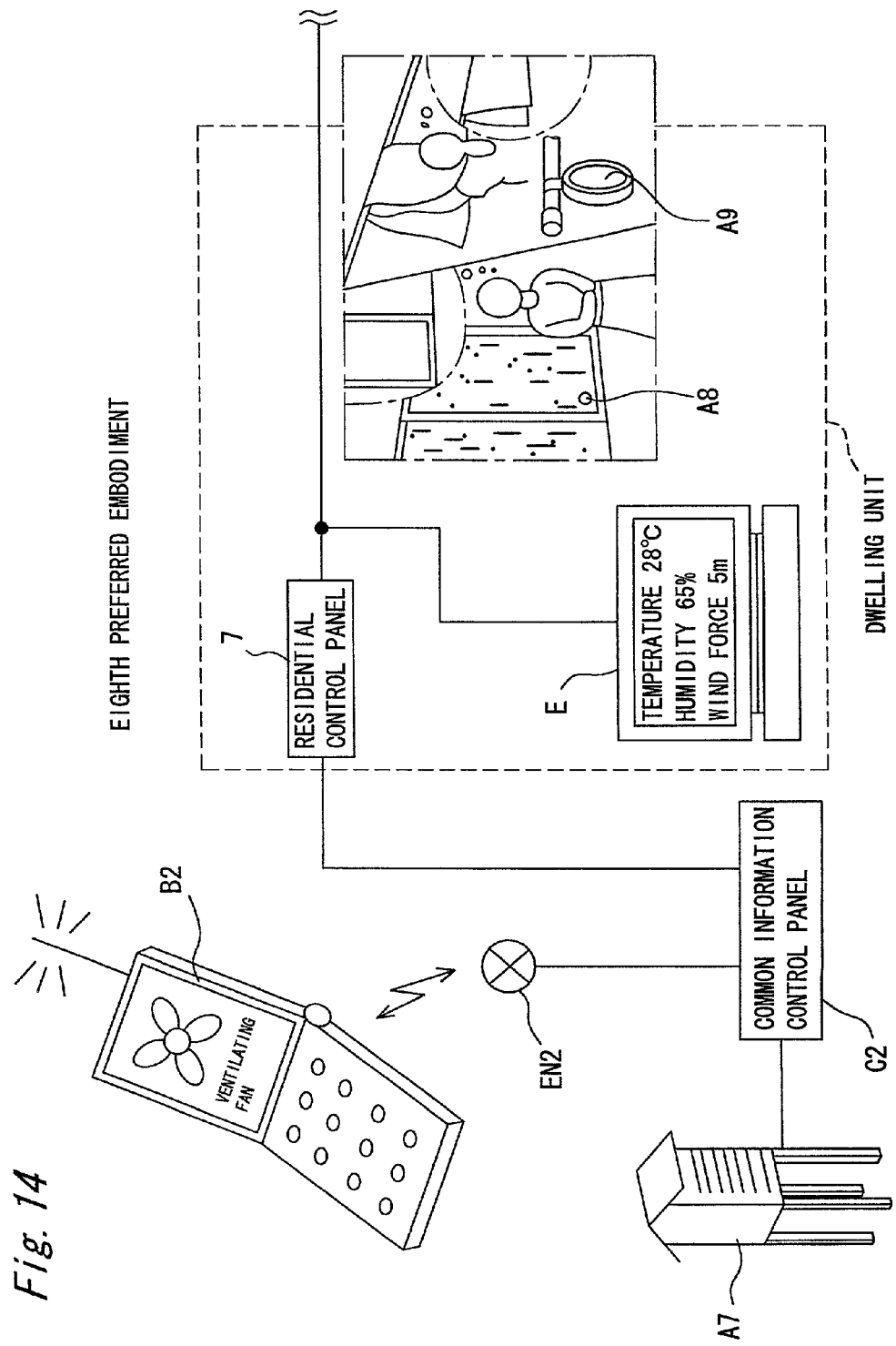
FIG. 14 is a schematic block diagram showing a configuration of a communication system according to an eighth preferred embodiment of the present invention.

FIG. 14 is a schematic block diagram showing a configuration of a communication system according to an eighth preferred embodiment of the present invention. The eighth preferred embodiment will be described below with reference to FIG. 14.

In the communication system shown in FIG. 14, the control apparatus is provided as a common information control panel C2. The common information control panel C2 is connected with a local terminal apparatus group. More specifically, a group of local terminal apparatus includes a local terminal apparatus A7 having a temperature supervisory function by a temperature sensor, a local terminal apparatus A8 having a dew condensation supervisory function by a dew condensation sensor, a local terminal apparatus A9 having a rainfall supervisory function by a rainfall sensor, and a local terminal apparatus (not shown) having a supervisory function by a wind force sensor.

In this case, the status value information is as follows. In the case of the temperature sensor, the status value information is a temperature value, and in the case of the dew condensation sensor, the status value information is binary information whether or not dew condensation occurs. In the case of the rainfall sensor, the status value information is binary information whether or not a rainfall is more or less than a predetermined threshold value and a rainfall amount. In the case of the wind force sensor, the status value information is a wind force and a main wind direction. In the case of the power rain shutter door, the status value information is binary information whether or not the rain shutter door is now opened or closed and an open and close control instruction. In the case of the ventilating fan, the status value information is binary information whether or not the ventilating fan is now driven or stopped, ventilation control and ventilation stop control.

In the eighth preferred embodiment, it is possible to confirm a supervisory status of the supervisory function of environmental sensors such as the local terminal apparatuses A7 to A9 by using the remote terminal apparatus B2.

In this case, the common information control panel C2 is connected with the local terminal apparatus A6 having a load control function of opening and closing a plurality of power rain shutter doors LD1 described in the seventh preferred embodiment and the local terminal apparatus (not shown) having a load control function of opening and closing a ventilating fan. By this arrangement, it is possible to carry out a remote control for electric power load controlled by each local terminal apparatus having the local control function as described above in accordance with a supervisory status of the supervisory function of the above-mentioned environmental sensor. For example, in accordance with change of weather, it is possible to carry out a remote supervisory control of ventilation with respect to each dwelling unit. Moreover, based on the information given from a meteorological sensor or sensors, it is possible to carry out a remote control for the power rain shutter door by the remote terminal apparatus via the local terminal apparatus.

Further, even if the user goes out after drying Japanese futons with air which are arranged under the eaves of the house, it is possible to grasp a weather status under the eaves of the house from the place where the he goes out. In the case of the temperature sensor, he can know the temperature of his house at the place where he goes out, and therefore, heating or cooling is started on the way of going back home, and when he reaches home, he feels comfortable because heating or cooling is sufficiently performed in his room. In the case of the dew condensation sensor, he can know the binary information whether or not dew condensation is generated at his house from the place where he goes out, and therefore, he can recognize that he must go back home in a hurry in order to take in the Japanese futons which are dried with air. In addition, he can imagine that the power rain shutter door should be closed. In the case of the rainfall sensor, he can know the binary information whether or not an amount of rainfall is more or less than a predetermined threshold value, and he can also know the amount of rainfall at the place where he goes out. Therefore, he knows that rain is likely to fall, so that he can make a judgment that he should go back home in a hurry in order to take in the Japanese futons or a cage. In addition, he can imagine that the power rain shutter door should be closed. In the case of the wind force sensor, he can know a wind force and a main wind direction at the place where he goes out, and therefore, when a strong wind is rising, he can recognize that he should go back home in a hurry in order to take in washings or the Japanese futons which are dried with air.

He can know the binary information whether or not the power rain shutter door is now opened or closed, open and close instructions at the place where he goes out. Therefore, he can know that he forgets to close the rain shutter door at the place where he goes out, and he can open and close the window by remote control. He can know the binary information whether or not the ventilating fan is now driven or stopped, ventilation control and ventilation stop at the place where he goes out. Therefore, he can know that he forgets to stop the ventilating fan at the place where he goes out, and he can stop and start the ventilating fan by remote control.

Ninth Preferred Embodiment

Figure 15:
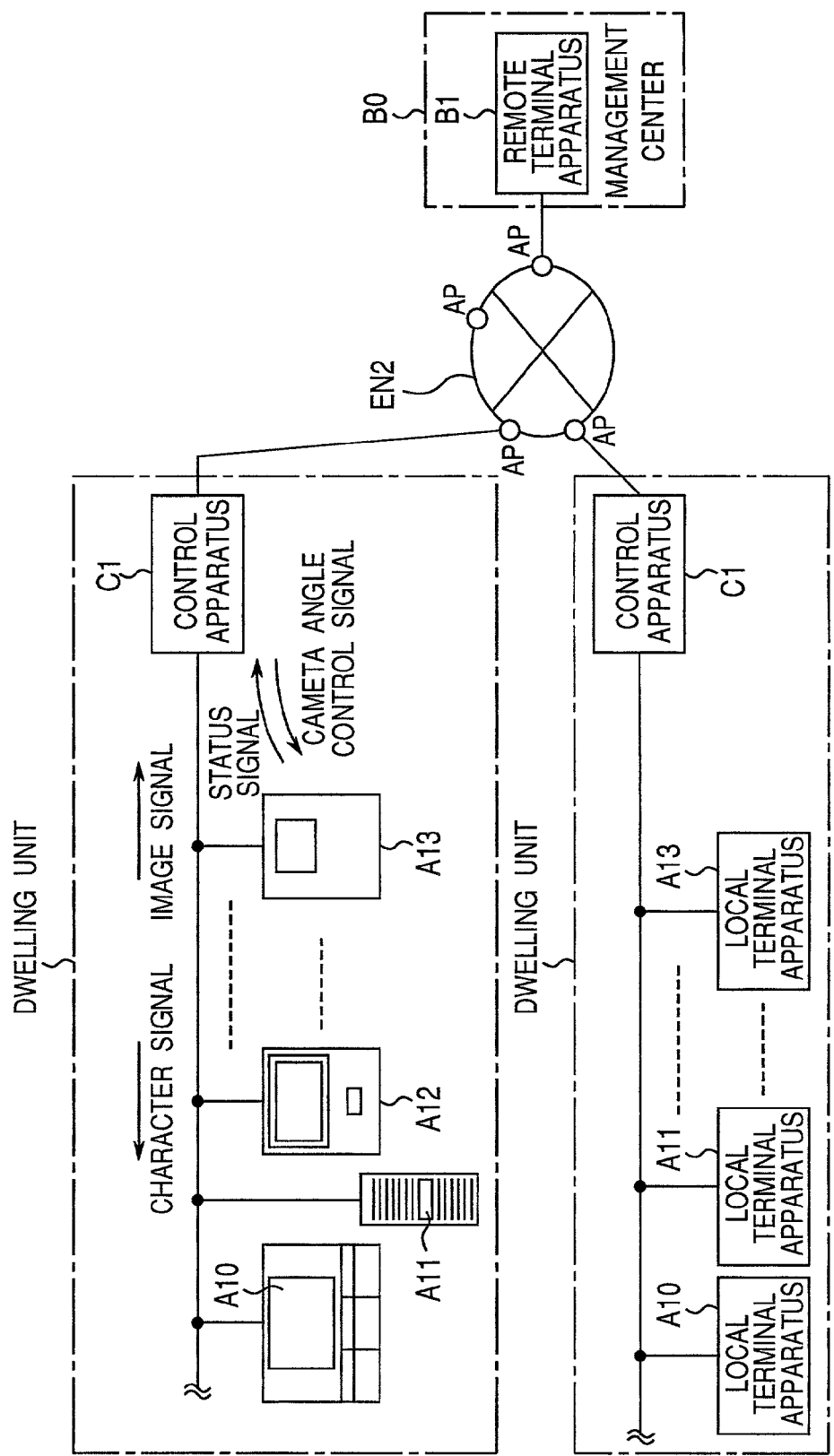
FIG. 15 is a schematic block diagram showing a configuration of a communication system according to a ninth preferred embodiment of the present invention.

FIG. 15 is a schematic block diagram showing a configuration of a communication system according to a ninth preferred embodiment of the present invention. The ninth preferred embodiment will be described below with reference to FIG. 15.

In the communication system shown in FIG. 15, the control apparatus C1 is connected with a local terminal apparatus used as camera unit mounted equipments. The camera unit mounted equipments include an entryphone A10 with camera, a door phone A11, a lobby receiving apparatus with camera (lobby entryphone) A12, and a video supervisory camera A13. These camera unit mounted equipments are used for answering to visitors and for securities. Moreover, the remote terminal apparatus B1 is provided in a management center B0 of a security company, which contracts to prevent crimes. In each dwelling unit, a mobile (portable) type remote terminal apparatus B2 is used.

In this case, as the status value information, a speech (voice transmission and reception), camera on/off control (binary information), remote control of camera angle (horizontal and vertical) and the like are used.

When a visitor comes to a dwelling unit, a message that the visitor comes is forcedly given to the remote terminal apparatus B2. If there is a need of answering to the visitor, communication using an image signal and a conversation speech signal is made between the remote terminal apparatus B2 and the local terminal apparatus used as the camera unit mounted equipment which is taking an image of the visitor. When finding an intruder, an image signal (either of still or dynamic image) indicative that an intruder exists is forcedly sent to the remote terminal apparatus B2. When the operator of the remote terminal apparatus B2 see and judge the visitor, if the visitor is not a person who lives together or an inviting visitor, the information that an intruder exists is sent to the management center B0 from the remote terminal apparatus B2 via the Internet EN2. Moreover, a request signal for video data (recorded image data at the present, or past recorded image data) may be sent at a desired time from the management center B0 to the local terminal apparatus used as the camera unit mounted equipment (supervision for security relying upon a management center for security).

For example, it is possible to see an image of the image signal around the surroundings while seeing the image of the image signal taken by the camera and controlling the camera angle by remote control. For example, when a fire alarm sensor is operated, it is possible to supervise the image around the surroundings, and to periodically supervise a parking place for bicycles, which is a common area.

Tenth Preferred Embodiment

Figure 16:
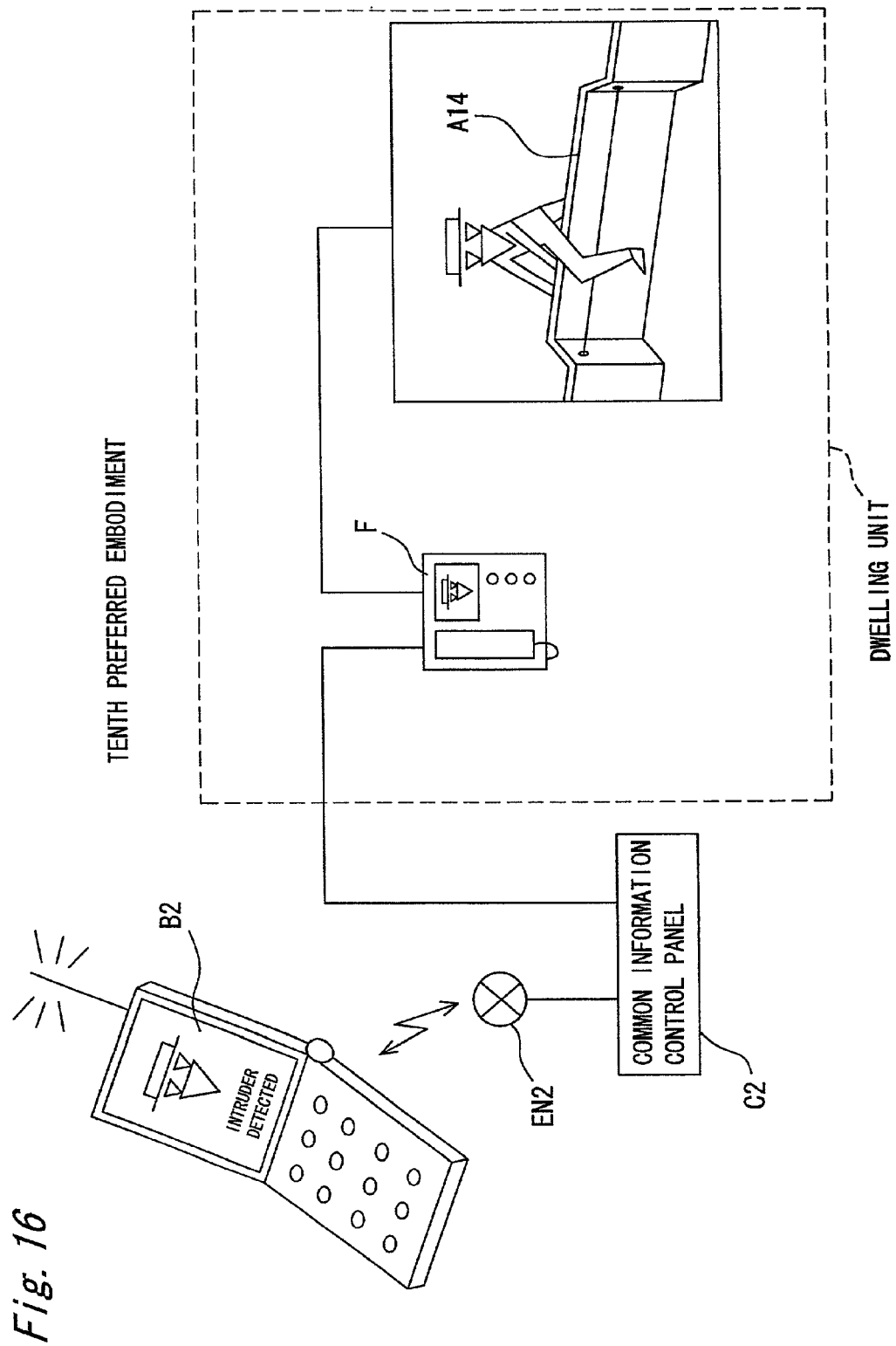
FIG. 16 is a schematic block diagram showing a configuration of a communication system according to a tenth preferred embodiment of the present invention.

FIG. 16 is a schematic block diagram showing a configuration of a communication system according to a tenth preferred embodiment of the present invention.

As shown in FIG. 16, the communication system may be further provided with a local terminal apparatus A14 having a supervisory function by a preventive sensor for detecting an intruder from a veranda or the like. By this arrangement, it is possible to supervise the existence of intruder, and to make a contact with the management center B0 as the need arises. Moreover, as seen from FIG. 16, a common information control panel C2 is provided as a control apparatus. The common information control panel C2 is connected with a calling apparatus F such as an entryphone having a telephone function, and the local terminal apparatus A14 is connected with the common information control panel C2 via the calling apparatus F.

Eleventh Preferred Embodiment

Figure 17:
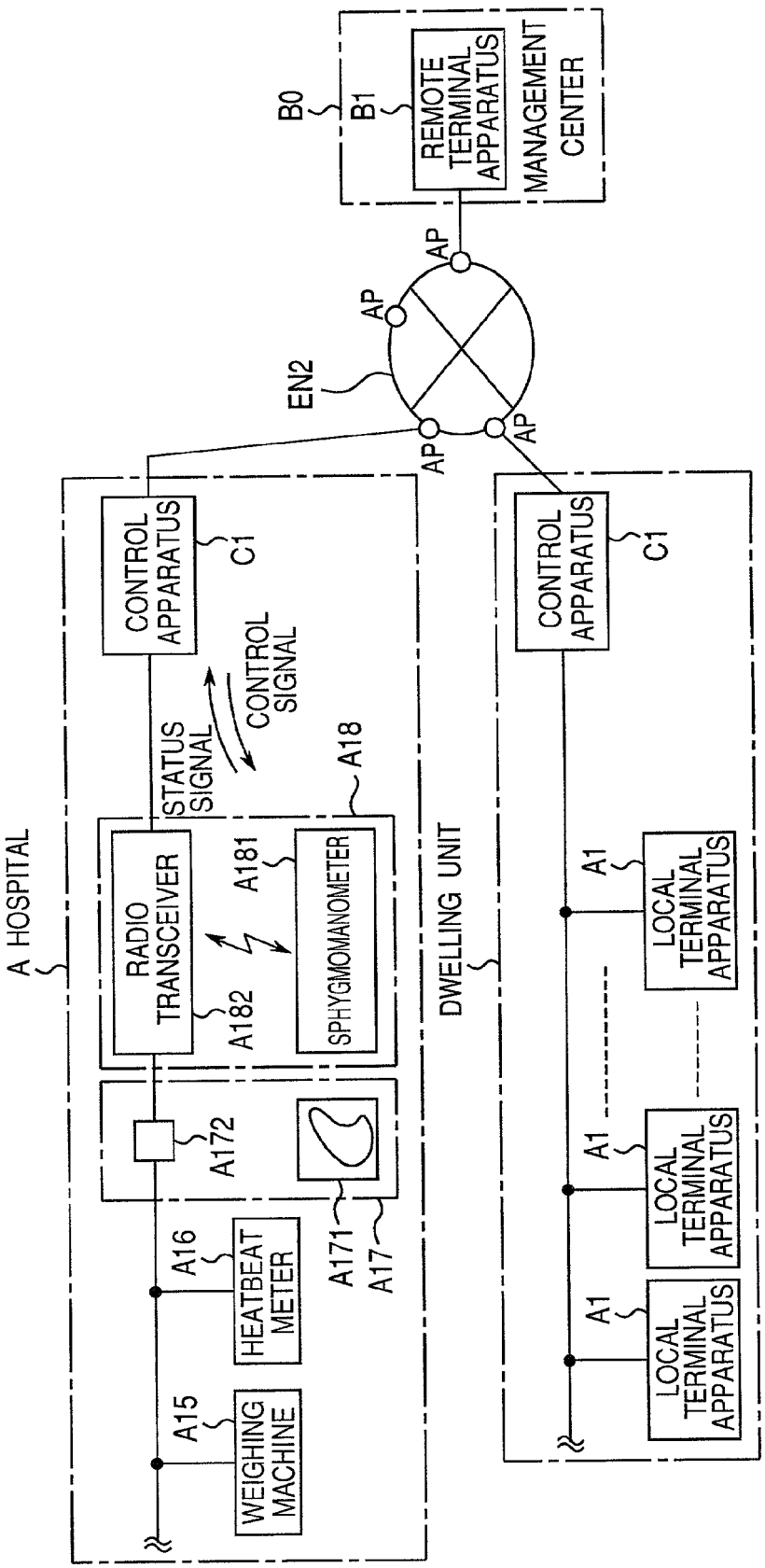
FIG. 17 is a schematic block diagram showing a configuration of a communication system according to an eleventh preferred embodiment of the present invention.

FIG. 17 is a schematic block diagram showing a configuration of a communication system according to an eleventh preferred embodiment of the present invention. The eleventh preferred embodiment will be described below with reference to FIG. 17.

In the communication system shown in FIG. 17, the control apparatus C1 is connected with a plurality of local terminal apparatuses having a supervisory function by a medical sensor including a vital sensor. For example, a local terminal apparatus A15 has a weight supervisory function by a weighing measuring machine, and a local terminal apparatus A16 has a heartbeat supervisory function by a heartbeat meter. A local terminal apparatus A17 has a main body A171 having a body temperature supervisory function by an aural thermometer, and a radio transceiver A172 for transmitting a supervisory status of the supervisory function to the control apparatus C1 by radio communication. A local terminal apparatus A18 has a main body A181 having a blood pressure supervisory function by a sphygmomanometer, and a radio transceiver A182 for transmitting a supervisory status of the supervisory function to the control apparatus C1 by radio communication. In addition, a local terminal apparatus (not shown) having a supervisory function by a blood sugar level meter and a drip residual monitoring apparatus is also used. The remote terminal apparatus B1 is provided in a management center B0 of a predetermined nurse station. A mobile (portable) type remote terminal apparatus B2 (not shown) is always used by a nurse during working time.

In this case, as the status value information, an on/off control (binary information) of each sensor and measured vital (blood pressure, blood sugar, body temperature, weight, heartbeat rate, etc.) of each sensor are used. Each local terminal apparatus having the supervisory function by medical sensor is provided with a function of forcedly giving the following information to the remote terminal apparatus B1 in the case where the status value information of one's own sensor exceeds a predetermined threshold value.

In the eleventh preferred embodiment, each local terminal apparatus is arranged so as to be horizontally expanded in a certain hospital, a family care facility, and a general health management room including a type provided in a mobile car. Therefore, the status information is always supervised in the hospital while being immediately informed thereof, and the status information is given to both the mobile remote terminal apparatus and the nurse station of the hospital while taking a care in a family.

Moreover, the following system is constructed in a manner that in accordance with a heartbeat rate, the nurse of the nurse station makes an answer to the status in a real time, and then, a call or conversation is possible by the local terminal apparatus of a calling apparatus shown in FIG. 15 or the like capable of inputting a voice.

Twelfth Preferred Embodiment

Figure 18:
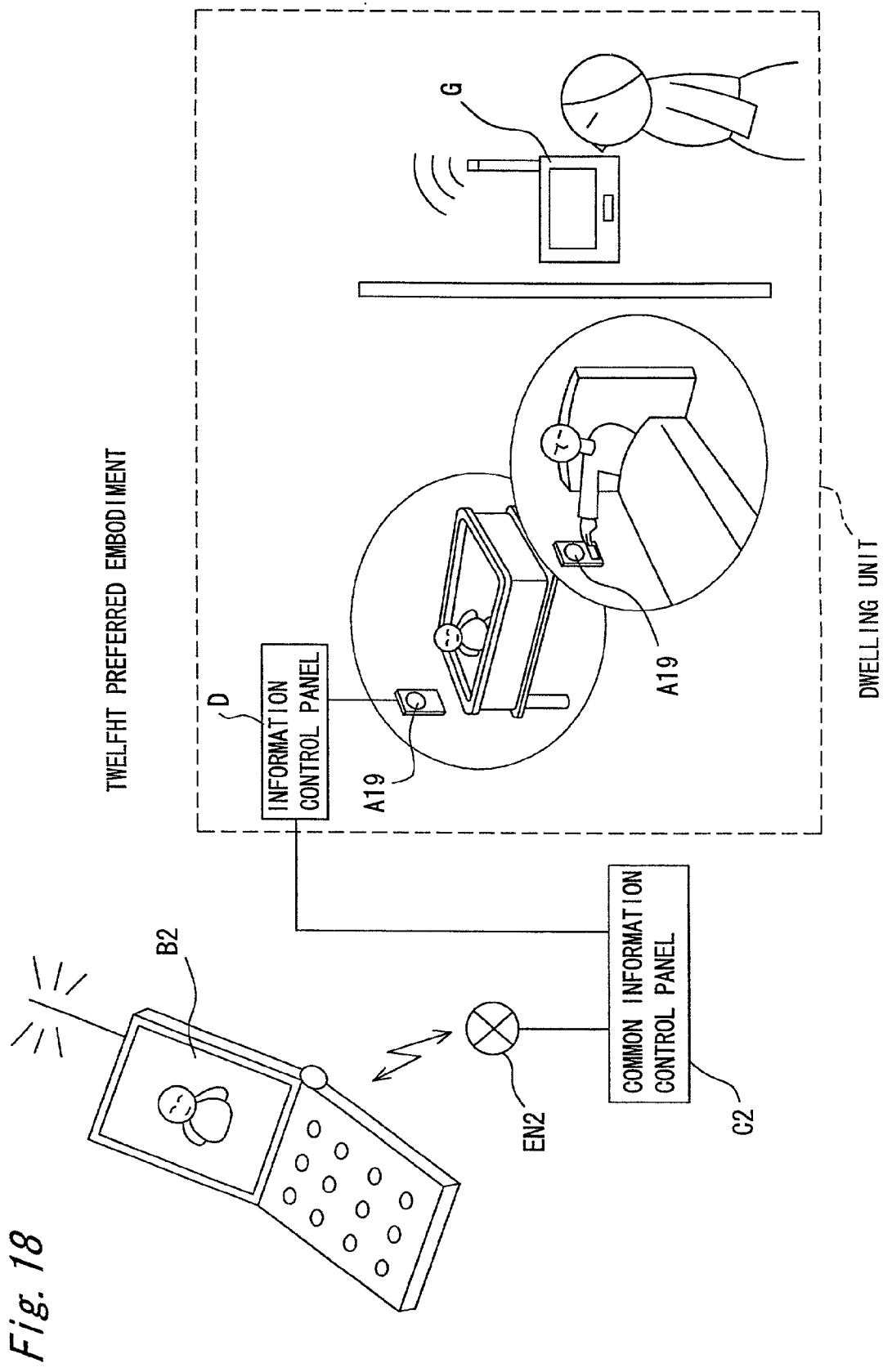
FIG. 18 is a schematic block diagram showing a configuration of a communication system according to a twelfth preferred embodiment of the present invention.

FIG. 18 is a schematic block diagram showing a configuration of a communication system according to a twelfth preferred embodiment of the present invention. The twelfth preferred embodiment will be described below with reference to FIG. 18.

Referring to FIG. 18, there is shown a simple communication system limited to a family. A local terminal apparatus A19 having a call button is provided near an old man, and a local terminal apparatus A19 having a directional microphone for hearing a cry is provided near a baby or infant. The local terminal apparatus A19 may have a call button and directional microphone. Further, the local terminal apparatus provided near the old man may be provided with a call button, and the local terminal apparatus provided near the baby may be provided with a directional microphone.

Both of the local terminal apparatuses A19 are connected with a supervisory monitor G (both of the cable and radio types thereof may be employed) in a living room and kitchen, and a person, who is near the living room and kitchen, can know the information by sound. At the place where the user goes out, the information is forcedly given to a mobile type remote terminal apparatus B2, and this leads to that it is possible to inform the abnormal matter generated in the old man and baby of family to a family having the remote terminal apparatus B2, who goes out, e.g., for shopping.

Further, the above local terminal apparatus A19 has a supervisory function by camera, and therefore, it is possible to confirm a video supervisory status of the supervisory function of the local terminal apparatus A19 using a supervisory monitor G and the remote terminal apparatus B2 together with a speech information.

In the communication system of FIG. 18, the common information control panel C2 is provided as a control apparatus, and each local terminal apparatus A19 is connected with the common information control panel C2 via the residential control panel D.

Thirteenth Preferred Embodiment

Figure 19:
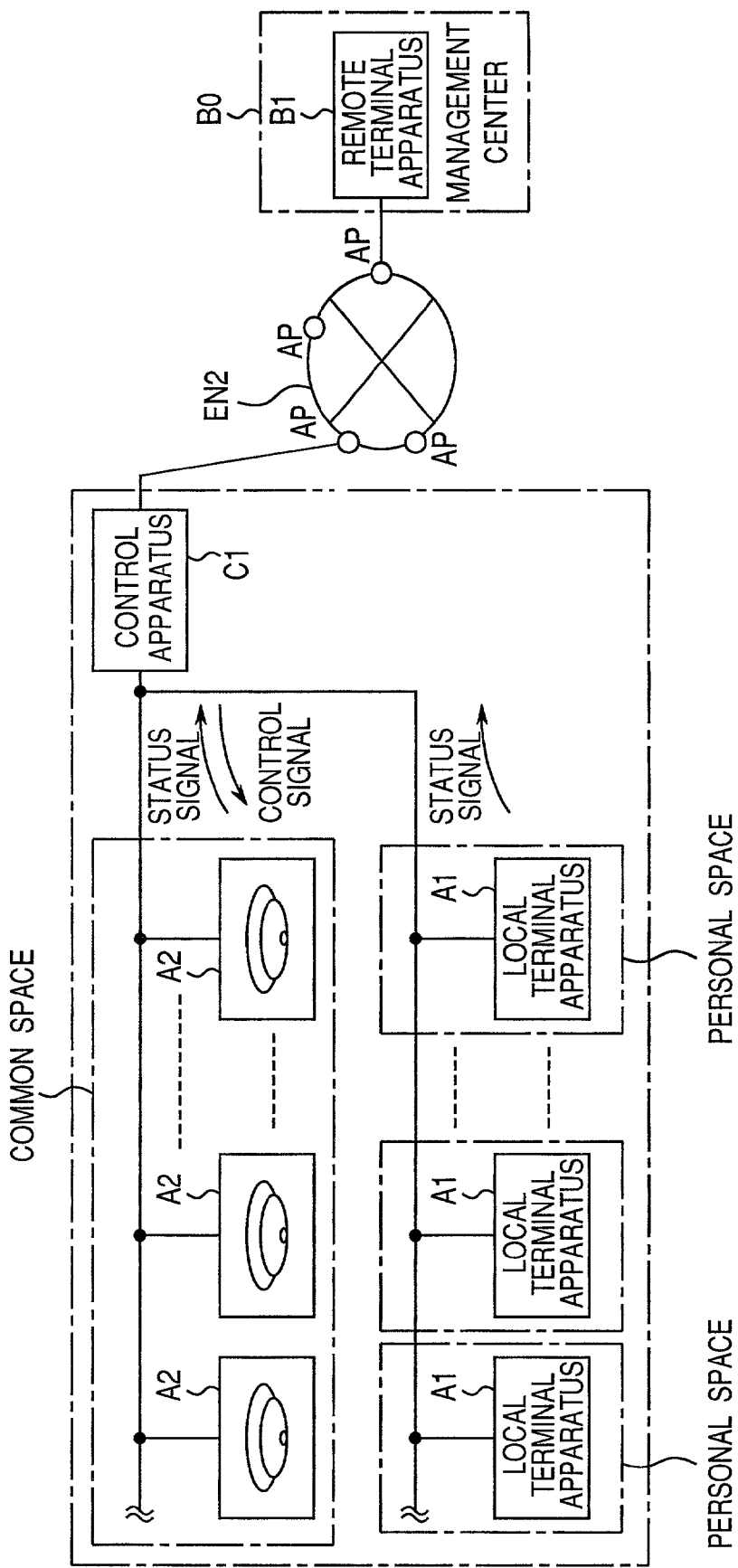
FIG. 19 is a schematic block diagram showing a configuration of a communication system according to a thirteenth preferred embodiment of the present invention.

FIG. 19 is a schematic block diagram showing a configuration of a communication system according to a thirteenth preferred embodiment of the present invention. The thirteenth preferred embodiment will be described below with reference to FIG. 19.

In the communication system shown in FIG. 19, a local terminal apparatus A1 is connected with the control apparatus C1. Further, the local terminal apparatus A1 is selectively used in a predetermined common use utility (the common use area comprising a plurality of local terminal apparatuses A2 in FIG. 19) such as a lobby of apartment house and for each dwelling unit (the dwelling units includes a private room A, a private room B, . . . , a private room Z), which is a private space. A remote terminal apparatus B1 is provided in a management center B0 of a company, which contracts to prevent crimes and to guard against robbers.

The feature of this communication system lies in a predetermined common use utility such as a lobby of apartment house. The common use utility is connected with a local terminal apparatus having various supervisory functions, and this leads to that, for example, it is possible to supervise a lobby having a structure hard to be in the public eye, and to supervise a molester in an elevator facility or the like for the purpose of preventing a minor offence.

Fourteenth Preferred Embodiment

Figure 20:
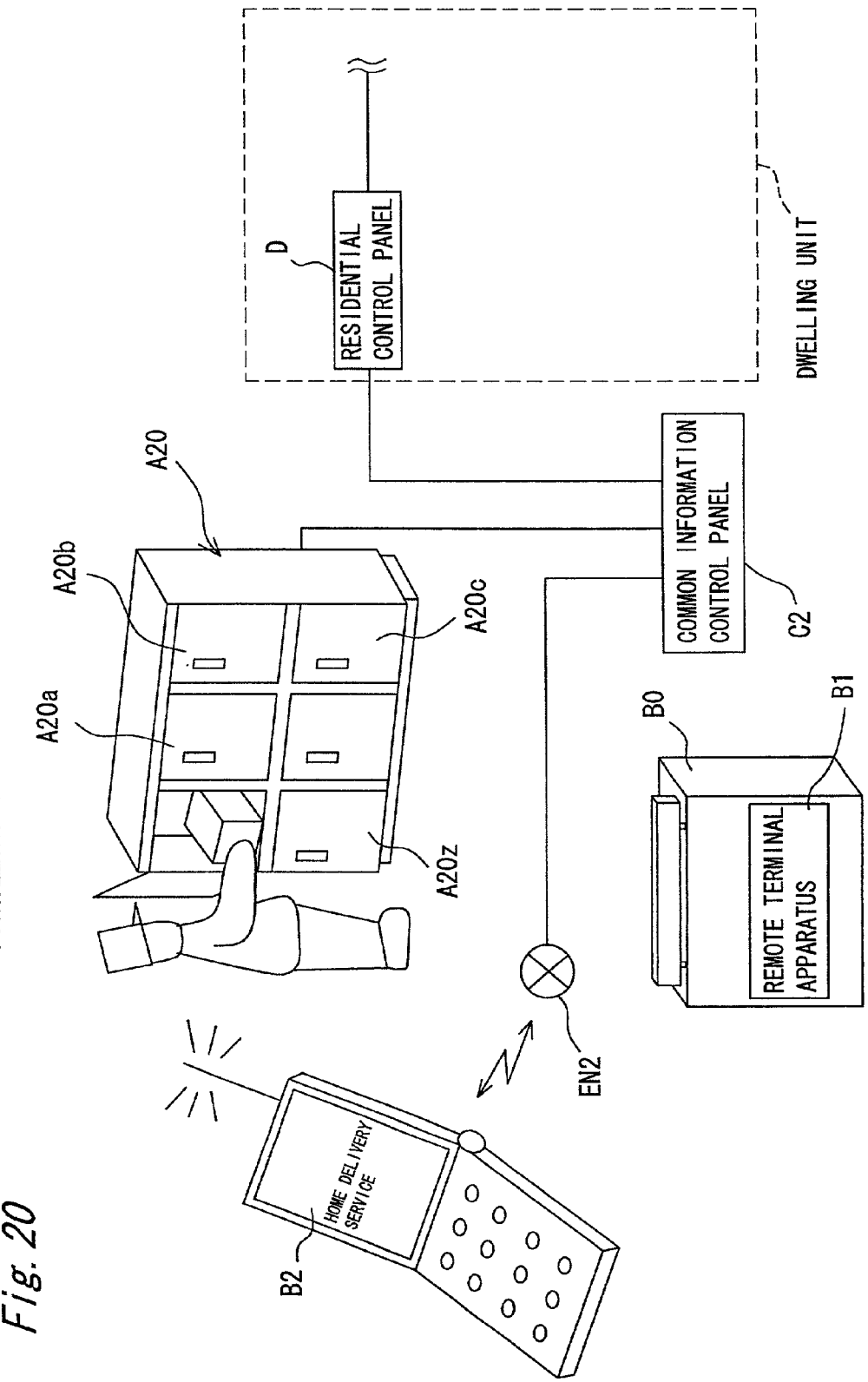
FIG. 20 is a schematic block diagram showing a configuration of a communication system according to a fourteenth preferred embodiment of the present invention.
Figure 21:
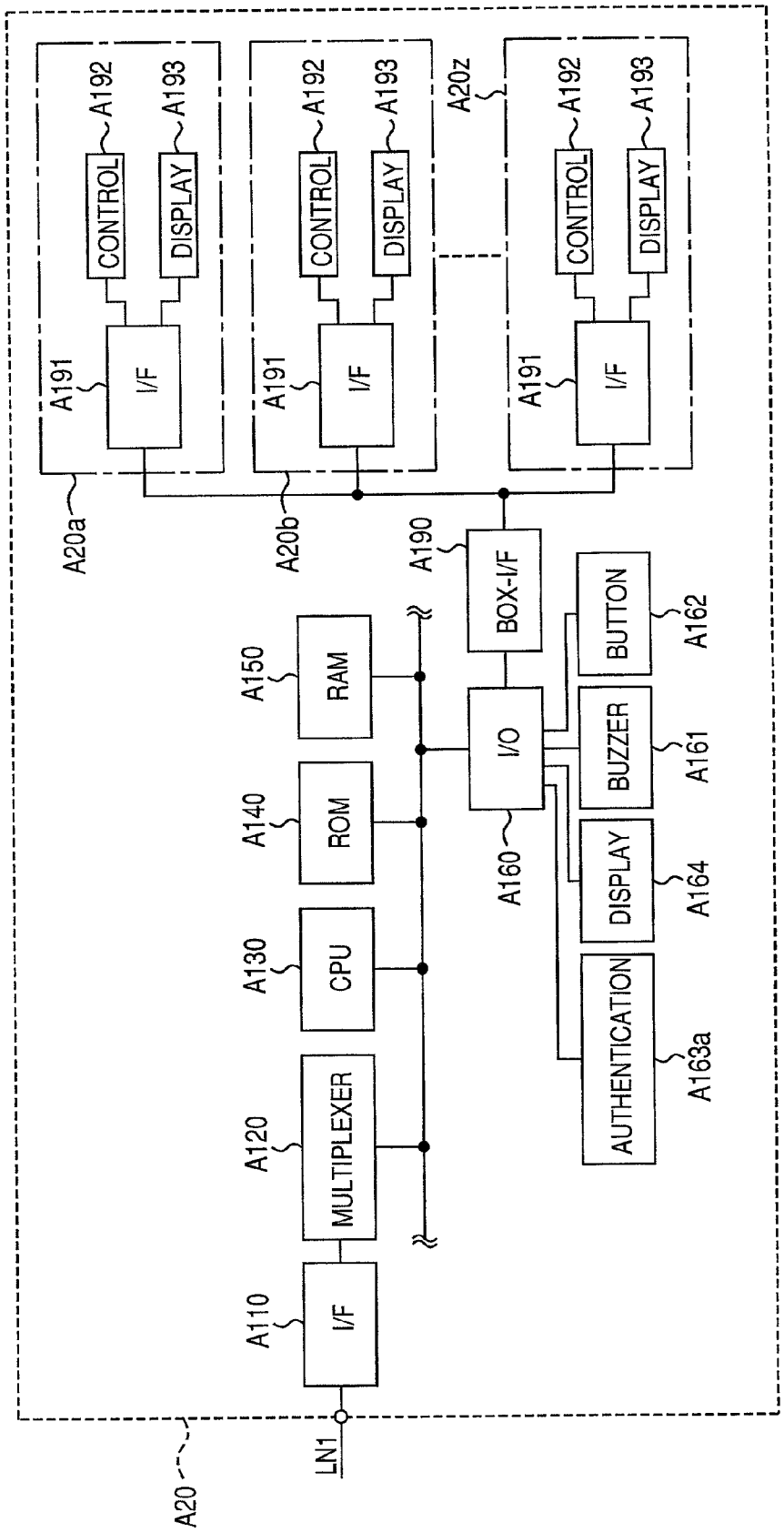
FIG. 21 is a schematic block diagram showing a detailed configuration of a local terminal apparatus A20 shown in FIG. 20.

FIG. 20 is a schematic block diagram showing a configuration of a communication system according to a fourteenth preferred embodiment of the present invention, and FIG. 21 is a schematic block diagram showing a detailed configuration of a local terminal apparatus A20 shown in FIG. 20. The fourteenth preferred embodiment will be described below with reference to these FIG. 20 and FIG. 21.

In the communication system shown in FIG. 20, a home delivery service box is used as a local terminal apparatus A20, and is provided in a common use utility such as a lobby of apartment house or the like. In the communication system shown in FIG. 20, a common information control panel C2 is provided as a control apparatus, and the local terminal apparatus A20 is connected with the common information control panel C2, and on the other hand, each local terminal apparatus (not shown) is connected with the common information control panel C2 via a residential control panel D. Moreover, a remote terminal apparatus B1 is provided in a management center of a predetermined company.

Conventionally, it is impossible for a user to confirm whether or not goods to be delivered is put in a private delivery service box at the place where the user goes out. Moreover, in the case where the user asks a reliable third person to take out his private good to be delivered, the user is unwilling to tell an authentication key input number required for opening and closing the door of box to the third person. As a result, even if the delivered good is a fresh good or perishables to be received in a hurry, the user must take the good after he comes back home.

In order to solve the inconvenient matter as described above, in the fourteenth preferred embodiment, the following arrangement is employed. More specifically, as shown in FIG. 21, the local terminal apparatus A20 has A110, A120, A130, A140, A150, A160, A161 and A162 shown in FIG. 5. In addition, the local terminal apparatus A20 has an authentication key-in sensor (AUTHENTICATION) A163a in place of the sensor A163, and further, has a display A164. The authentication key-in sensor A163 senses and authenticates an input of password, which is known by only individual. The key-in input method may be a key input of the password, or an individual personal identification card recording an authentication data may be inserted into a card reader so as to make a collation.

Referring to FIG. 21, a reference numeral A190 denotes an interface (BOX-I/F) interposed between a plurality of private boxes and the CPU A130. Each of private boxes A20a, A20b, . . . , A20d is provided with each of connection interface (I/F) A191. In an example of the private box A20a, the connection interface A191 is connected with an open/close control unit (CONTROL) A192 and a small-sized liquid crystal panel (DISPLAY) A193. The open/close control unit A192 is connected with a sensor (not shown) for detecting the existence of delivered good, such as a load cell, an infrared sensor, a tilt angle sensor or the like. Further, the open/close control unit A192 is connected with a motor (not shown) for controlling opening and closing a front door of the private box A20a.

Then, in the open/close control unit A192, as the status value information, the following data is used. More specifically, the status information includes the existence of delivered good (binary information whether or not there exist a delivered good) and the open/close information of the front door of the private box A20a when confirming a authentication OK sign by the authentication key-in sensor A163 (binary information whether or not the door is opened or close). The status value information is read from the portable type remote terminal apparatus B2.

In the fourteenth preferred embodiment, it is possible to privately control the reception and taking-out of delivered good in substantially a real time. Moreover, in a manner similar to that of the conventional case, the user may ask the deliver service company for management of the delivered good.

In addition, a predetermined company (home delivery service center) is connected with the delivery service box may by one telephone line without providing a dedicated line.

Fifteenth Preferred Embodiment

Figure 22:
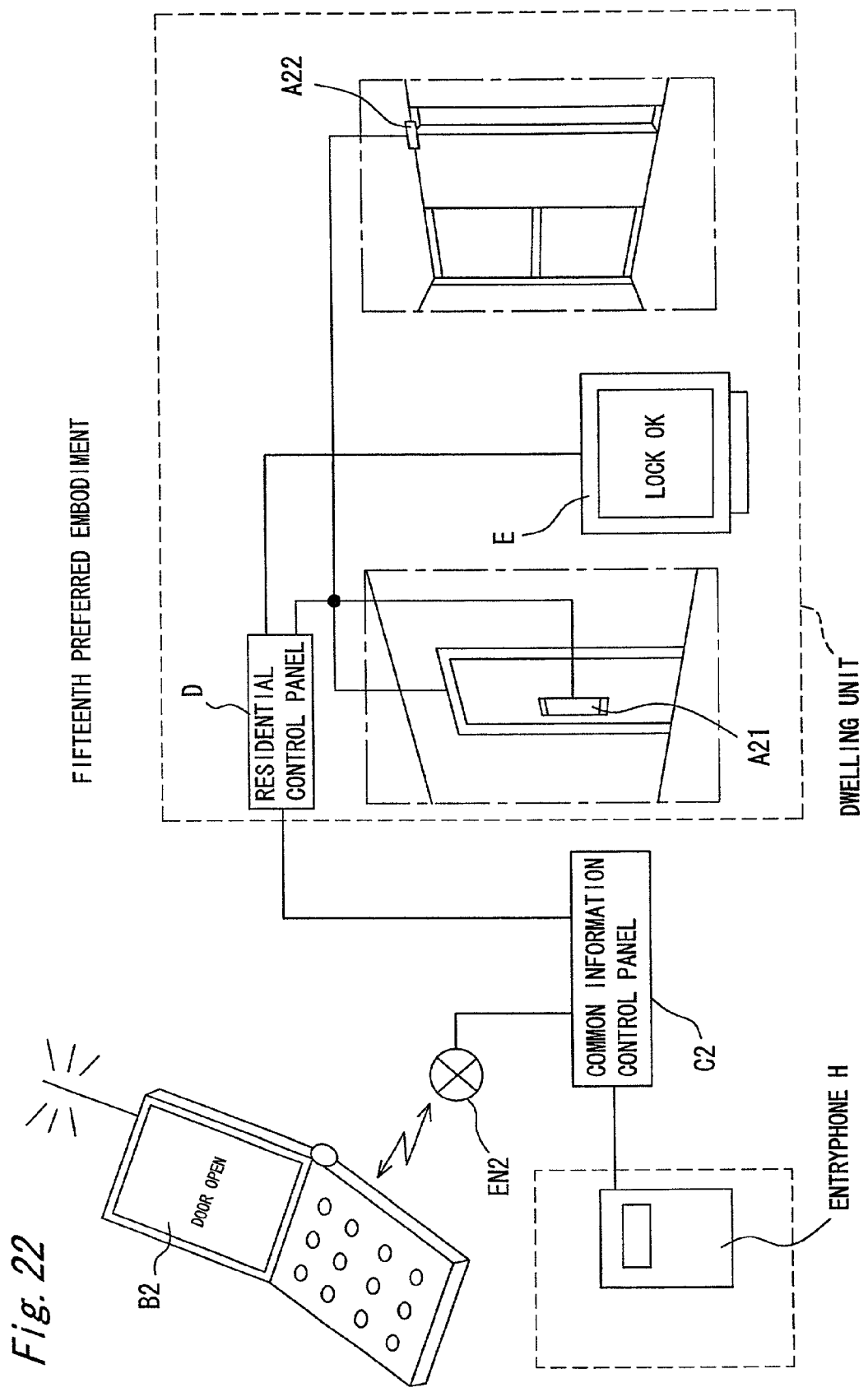
FIG. 22 is a schematic block diagram showing a configuration of a communication system according to a fifteenth preferred embodiment of the present invention.

FIG. 22 is a schematic block diagram showing a configuration of a communication system according to a fifteenth preferred embodiment of the present invention. The fifteenth preferred embodiment will be described below with reference to FIG. 22.

In the communication system shown in FIG. 22, a common information control panel C2 is provided as a control apparatus. The common information control panel C2 is connected with local terminal apparatus A21 and A22 having a supervisory function via a residential control panel D. The local terminal apparatus A21 has a supervisory function of supervising lock and unlock of electric key at a main entrance, and on the other hand, the local terminal apparatus A22 has a supervisory function of supervising opening and closing of window of veranda or the like. Further, the common information control panel C2 is connected with an entryphone H, and on the other hand, the residential control panel D is connected with a display apparatus E for displaying a supervisory status of the local terminal apparatuses A21 and A22.

A door with electric key supervised by the local terminal apparatus A21 is opened and closed by a card reader. On the other hand, a door supervised by the local terminal apparatus A22 is a window with no electric key, which has a lock key about at a height of human's waist. In the door with electric key, an electric key unit box has a function of supervising a lock and unlock of the above electric key. The general window has a supervisory function of supervising opening and closing by a newly mounted sensor for detecting opening and closing.

In this case, as the status value information, the following several information is only used. More specifically, the status includes the information whether or not the electric key unit box is opened and closed (binary information of open/close), the information whether or not the general window is opened and closed (binary information of open/close) and the information of open/close instruction of the electric key unit box (binary information of open/close instruction).

In the fifteenth preferred embodiment, when a resident does not know whether the window is opened or closed at the place where he goes out, it is possible to confirm whether the window is opened or closed by using a portable type remote terminal apparatus B2 without coming back his home.

Sixteenth Preferred Embodiment

Figure 23:
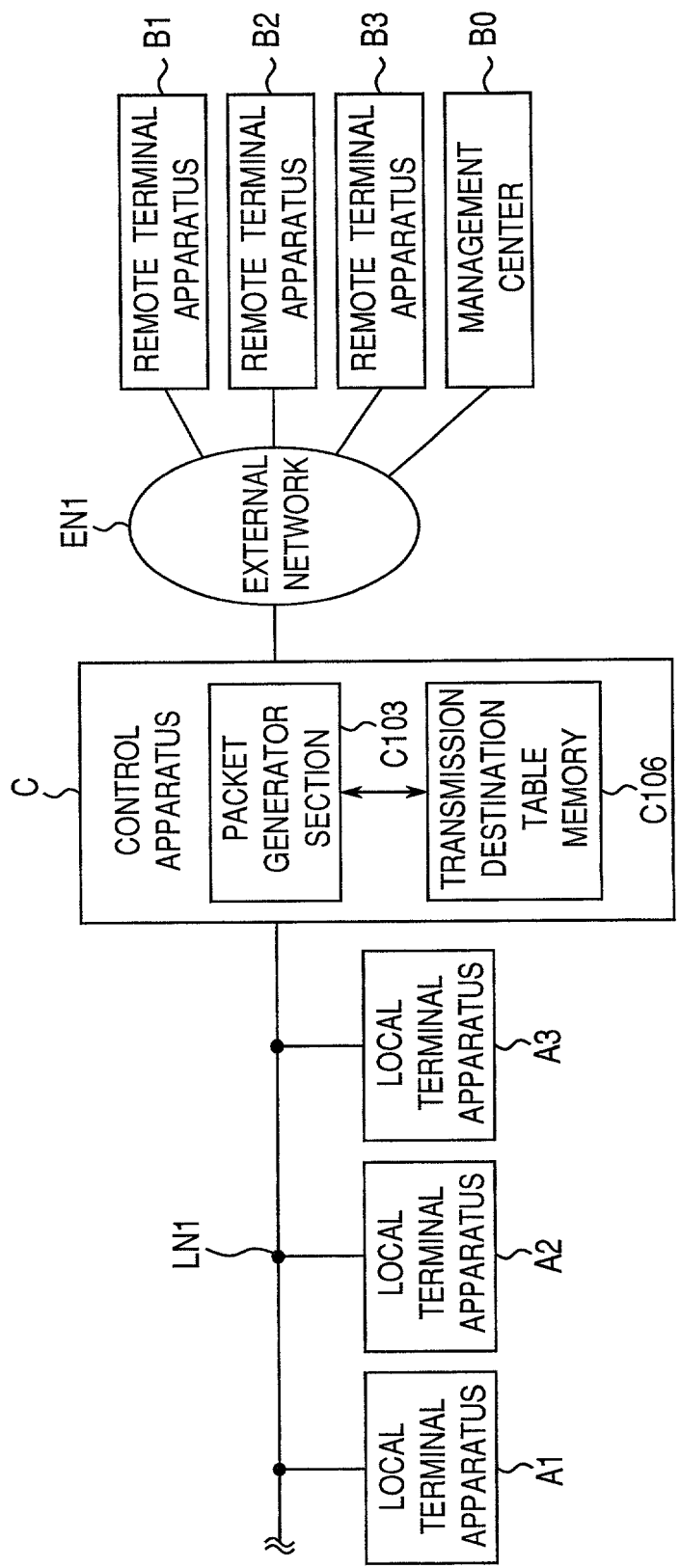
FIG. 23 is a schematic block diagram showing a configuration of a communication system according to a sixteenth preferred embodiment of the present invention.

FIG. 23 is a schematic block diagram showing a configuration of a communication system according to a sixteenth preferred embodiment of the present invention. The features of the present preferred embodiment is that the control apparatus C comprises the packet generator section C103 including a transmission destination table memory C106, and the packet generator section C103 transmits the received answer signal to the remote terminal apparatus determined by referring to a transmission destination table stored in the transmission destination table memory C106. The detail of the present preferred embodiment will be described.

Referring to FIG. 23, the control apparatus C is connected via the local network LN1 with the local terminal apparatuses A1, A2 and A3, and is also connected via the external network EN1 to the remote terminal apparatuses B1 to B3 and the remote terminal apparatus of the management center B0. The packet generator section C103 of the control apparatus C comprises the transmission destination table memory C106 for storing a transmission destination table including a transmission destination indicative of which one of the plurality of remote terminal apparatuses B0 to B3 the answer signal should be transmitted to, for each of the local terminal apparatus A1 to A3.

FIG. 24 is a view showing the transmission destination table for answer signal which is stored in the destination table memory C106 shown in FIG. 23. Referring to FIG. 24, the transmission destination table includes destination data for the answer signal for each transmitter thereof which is one of the local terminal apparatuses A1 to A3, where the destination data includes at least one of the remote terminal apparatus B1 to B3 and the management center B0.

In the present preferred embodiment, the packet generator section C103 of gateway means of the control apparatus C transmits the received answer signal to the remote terminal apparatus determined by referring to the transmission destination table stored in the transmission destination table memory C106, via the external network EN1.

According to the present preferred embodiment, it is possible to transmit the status information of the predetermined processing or function to a proper transmission destination.

FIG. 25 is a view showing a transmission destination table for answer signal of a modified preferred embodiment of the sixteenth preferred embodiment. In the modified preferred embodiment, the transmission destination table shown in FIG. 25 is provided in stead of that shown in FIG. 24. The transmission destination table memory C106 stores the transmission destination table including a transmission destination indicative of which one of the plurality of remote terminal apparatuses B0 to B3 the answer signal should be transmitted to, for each of the local terminal apparatus A1 to A3 and for each status information of the received answer signal. Concretely speaking, referring to FIG. 25, the transmission destination table includes destination data for the answer signal for each transmitter thereof which is one of the local terminal apparatuses A1 to A3, and for change in status information, where the destination data includes at least one of the remote terminal apparatus B1 to B3 and the management center B0, and the change in status information includes a change from normal status to abnormal status and a change from abnormal status to normal status.

According to the present modified preferred embodiment, it is possible to transmit the status information of the predetermined processing or function to a proper transmission destination.

Seventeenth Preferred Embodiment

FIG. 26 is a schematic block diagram showing a configuration of a communication system according to a seventeenth preferred embodiment of the present invention. The features of the present preferred embodiment is that the CPU A130 of each of the local terminal apparatuses A1 to A3 comprises a transmission destination table memory A151, and the CPU A130 transmits the answer signal to the remote terminal apparatus determined by referring to a transmission destination table stored in the transmission destination table memory A151. The detail of the present preferred embodiment will be described.

Referring to FIG. 26, the control apparatus C is connected via the local network LN1 with the local terminal apparatuses A1, A2 and A3, and is also connected via the external network EN1 to the remote terminal apparatuses B1 to B3 and the remote terminal apparatus of the management center B0. The CPU A130 of each of the local terminal apparatuses A1 to A3 comprises the transmission destination table memory A151 for storing a transmission destination table including a transmission destination indicative of which one of the plurality of remote terminal apparatuses B0 to B3 the answer signal should be transmitted to.

FIG. 27 is a view showing the transmission destination table for answer signal which is stored in the destination table memory A151 shown in FIG. 26. Referring to FIG. 27, the transmission destination table includes destination data for the answer signal, where the destination data includes at least one of the remote terminal apparatus B1 to B3 and the management center B0.

In the present preferred embodiment, the CPU A130 of each of the local terminal apparatuses A1 to A3 transmits the answer signal to be transmitted to the remote terminal apparatus determined by referring to the transmission destination table stored in the transmission destination table memory A151, via the control apparatus C and the external network EN1.

According to the present preferred embodiment, it is possible to transmit the status information of the predetermined processing or function to a proper transmission destination.

FIG. 28 is a view showing a transmission destination table for answer signal of a modified preferred embodiment of the seventeen preferred embodiment. In the modified preferred embodiment, the transmission destination table shown in FIG. 28 is provided in stead of that shown in FIG. 27. The transmission destination table memory A151 stores the transmission destination table including a transmission destination indicative of which one of the plurality of remote terminal apparatuses B0 to B3 the answer signal should be transmitted to, for each of the local terminal apparatus A1 to A3, in accordance with each status information of the answer signal. Concretely speaking, referring to FIG. 28, the transmission destination table includes destination data for the answer signal, for change in status information, where the destination data includes at least one of the remote terminal apparatus B1 to B3 and the management center B0, and the change in status information includes a change from normal status to abnormal status and a change from abnormal status to normal status.

According to the present modified preferred embodiment, it is possible to transmit the status information of the predetermined processing or function to a proper transmission destination.

Eighteenth Preferred Embodiment

FIG. 29 is a schematic block diagram showing a configuration of a communication system according to an eighteenth preferred embodiment of the present invention. The feature of the present preferred embodiment is that the CPU B130 of each of the remote terminal apparatuses B1 to B3 and the management center B0 comprises a transmission destination table memory B151 including the same table as that shown in FIG. 27, and a request signal includes destination data indicated by a transmission destination table stored in the destination table memory B151.

In this case, the CPU B130 of each of the remote terminal apparatuses B1 to B3 and the management center B0 comprises the transmission table memory B151 for storing the transmission destination table including a transmission destination indicative of which one of the plurality of remote terminal apparatuses the answer signal corresponding to the request signal should be transmitted to. The CPU B130 transmits via the external network the request signal further including a transmission destination information of the answer signal corresponding to the request signal, where the transmission destination information is indicated by the transmission destination table stored in the transmission destination table memory B151. Further, each of the local terminal apparatuses A1 to A3 transmits the answer signal to be transmitted to the remote terminal apparatus or the management center indicated by the transmission destination information included in the request signal, via the local network LN1, the control apparatus C and the external network EN1.

According to the present preferred embodiment, it is possible to transmit the status information of the predetermined processing or function to a proper transmission destination.

In a modified preferred embodiment of the eighteenth preferred embodiment, the transmission destination table memory B151 includes the transmission destination table shown in FIG. 28 in stead of that shown in FIG. 27. In this case, the destination can be determined dependent on the change in the status information by each of the local terminal apparatuses A1 to A3.

According to the present modified preferred embodiment, it is possible to transmit the status information of the predetermined processing or function to a proper transmission destination.

Nineteenth Preferred Embodiment

Figure 30:
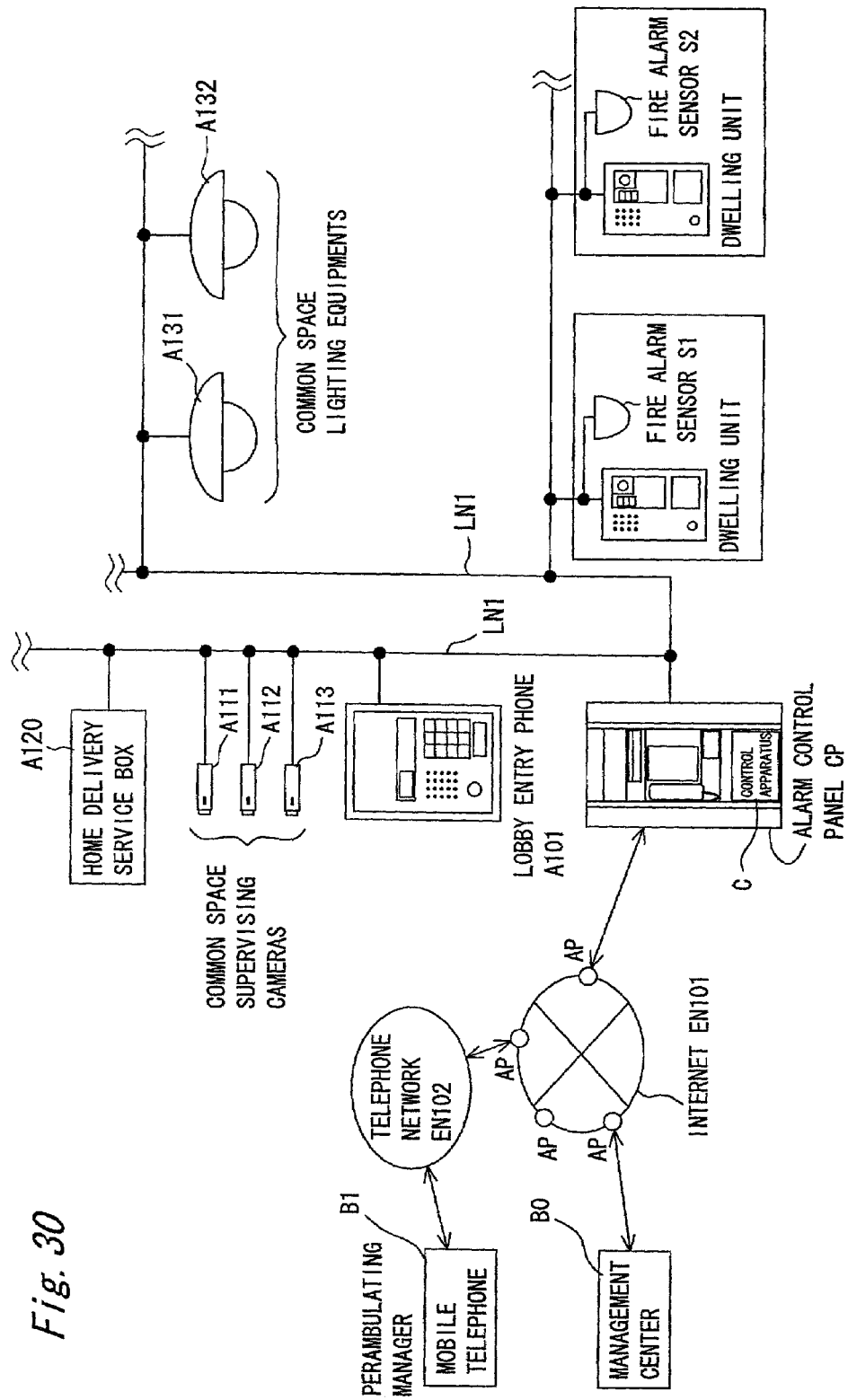
FIG. 30 is a schematic block diagram showing a configuration of a communication system according to a nineteenth preferred embodiment of the present invention.

FIG. 30 is a schematic block diagram showing a configuration of a communication system according to a nineteenth preferred embodiment of the present invention.

Referring to FIG. 30, the control apparatus C installed in an alarm control panel CP is connected via the Internet EN101 to the management center B0 and is connected via the Internet EN101 and a telephone network EN101 to a mobile telephone B1 which a perambulating manager carries. The control apparatus C is connected via the local network LN1 with fire alarm sensors S1 and S2 for each of the dwelling units, a lobby entry telephone A101, common space supervising cameras A111 to A113, a home delivery service box A120, and common space lighting equipments A131 and A132.

In a first operation example, when the fire alarm sensor S1 detects a fire, the status signal is broadcasted to destinations indicated by the transmission destination table installed in the control apparatus C of the alarm control panel CP, where the destinations includes the mobile telephone B1 and the management center B0.

In a second operation example, the management center B0 transmits a request signal via the control apparatus C to all the local terminal apparatuses including the fire alarm sensors S1 and S2 for each of the dwelling units, the lobby entry telephone A101, the common space supervising cameras A111 to A113, the home delivery service box A120, and the common space lighting equipments A131 and A132. In response to the request signal, each of the local terminal apparatuses transmits an answer signal including status information to the management center B0.

Twentieth Preferred Embodiment

Figure 31:
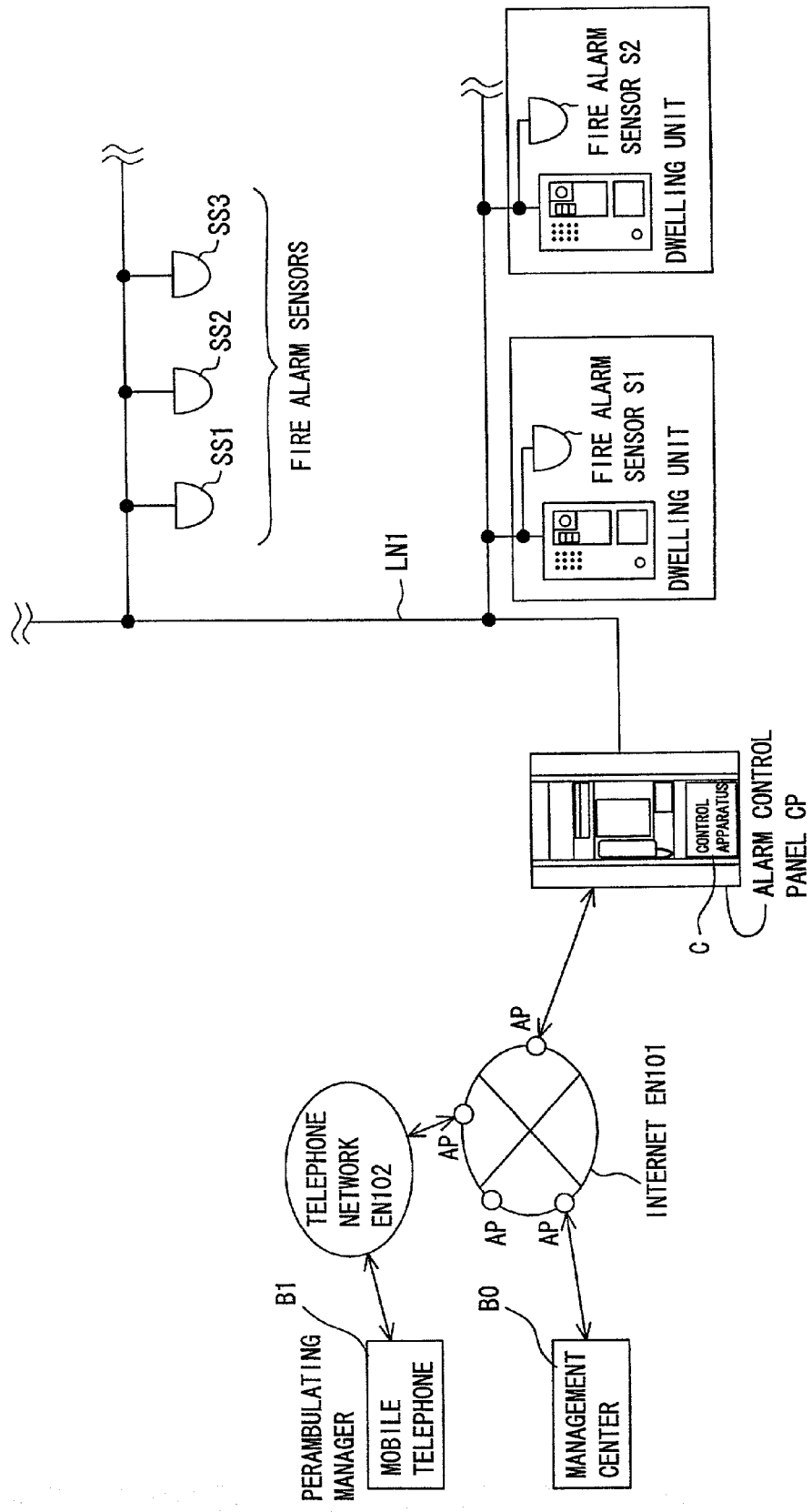
FIG. 31 is a schematic block diagram showing a configuration of a communication system according to a twentieth preferred embodiment of the present invention.
Figure 32A:
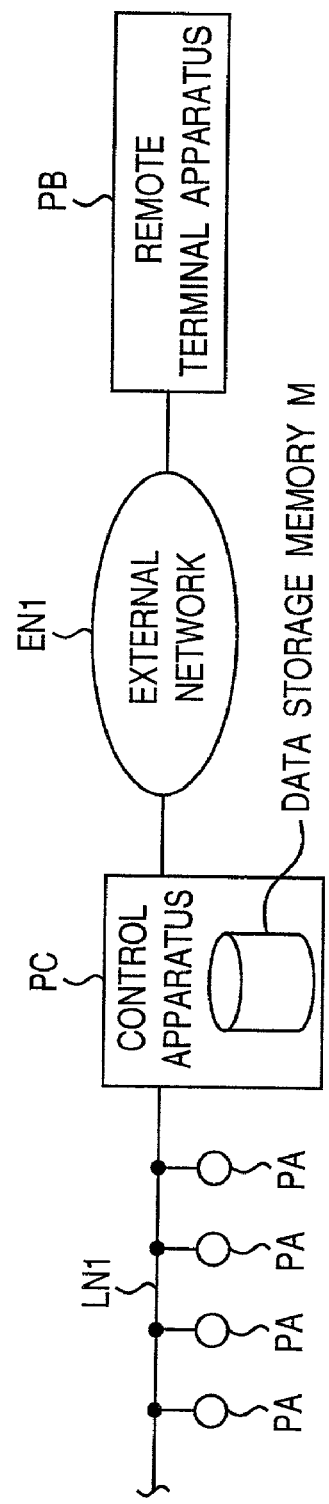
FIG. 32A is a schematic block diagram showing a configuration of a conventional communication system.
Figure 32B:
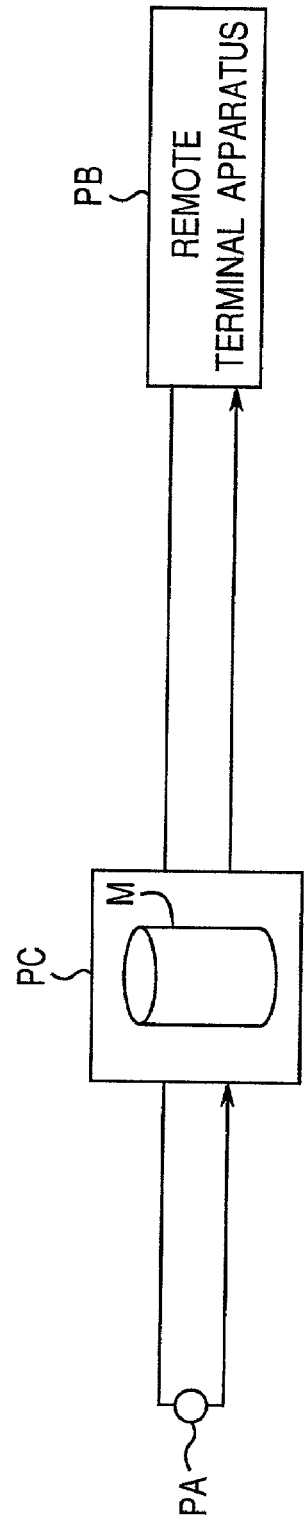
FIG. 32B is a schematic diagram showing a signal flow in the conventional communication system shown in FIG. 32A.
Figure 33:
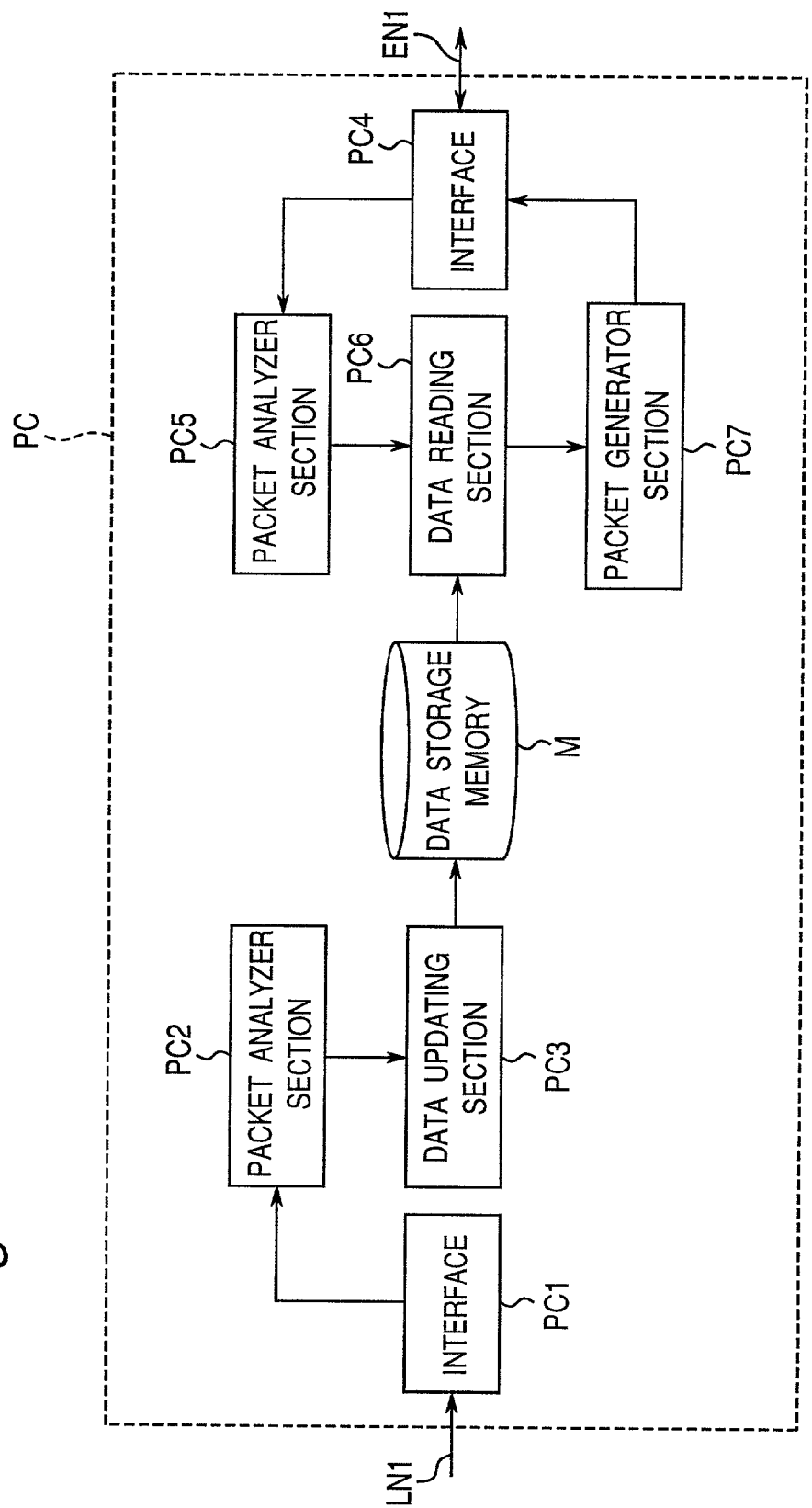
FIG. 33 is a schematic block diagram showing a functional configuration of a control apparatus PC shown in FIG. 32A.
Figure 34:
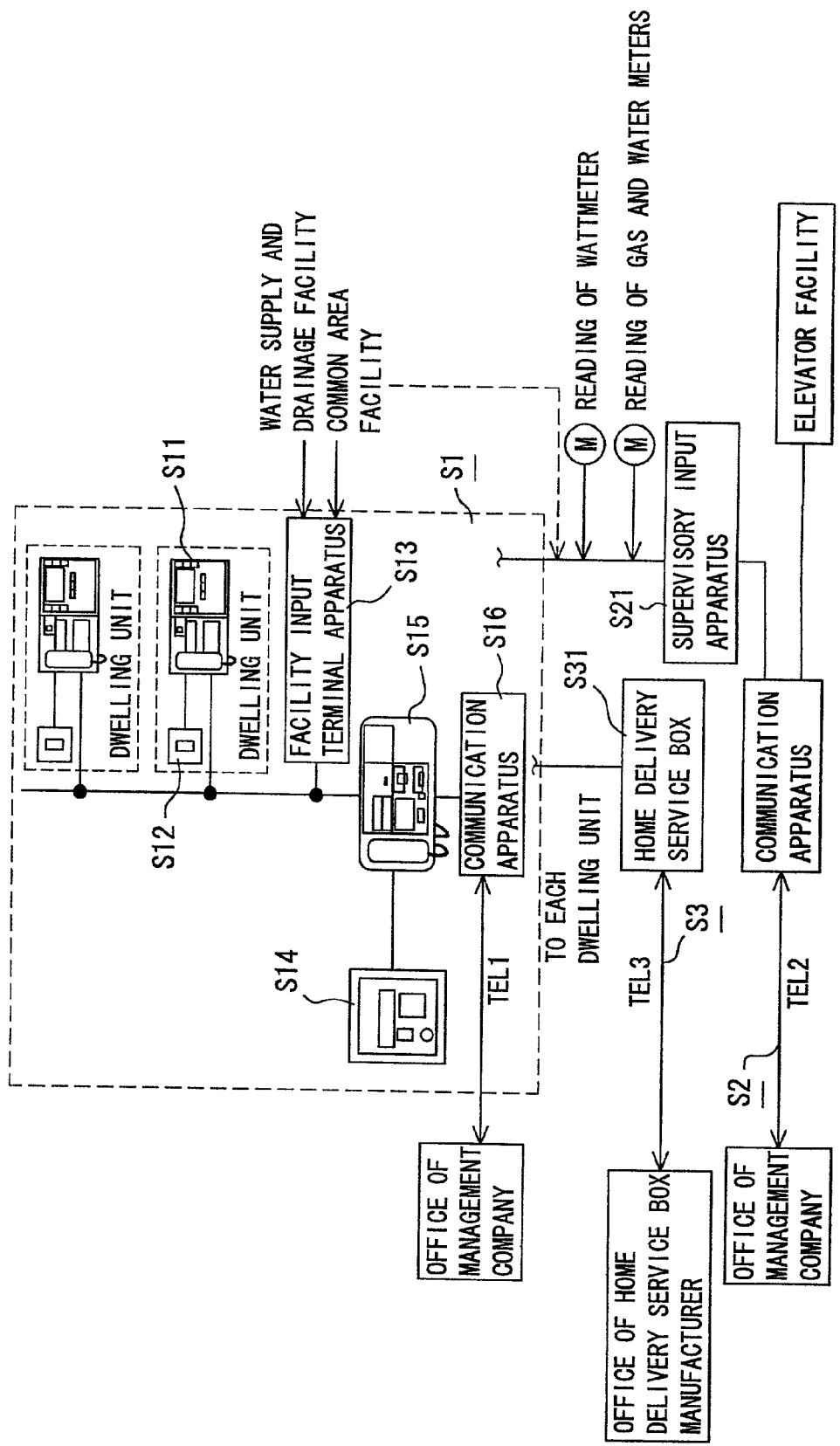
FIG. 34 is a schematic block diagram showing a configuration of another conventional communication system.

FIG. 31 is a schematic block diagram showing a configuration of a communication system according to a twentieth preferred embodiment of the present invention. This preferred embodiment is a modified preferred embodiment of the sixth preferred embodiment shown in FIG. 12.

Referring to FIG. 31, the control apparatus C installed in an alarm control panel CP is connected via the Internet EN101 to the management center B0 and is connected via the Internet EN101 and a telephone network EN101 to a mobile telephone B1 which a perambulating manager carries. The control apparatus C is connected via the local network LN1 with fire alarm sensors S1 and S2 for each of the dwelling units, and fire alarm sensors SS1, SS2 and SS3 which are located in a common space.

In a first operation example, when the fir sensor SS1 detects a sensing level of "seven" larger than a predetermined threshold level, the status signal is transmitted from the fir sensor SS1 of the local terminal apparatus via the control apparatus C to the management center B0 indicated by the transmission destination table installed in the control apparatus C. In response to the status signal, the management center B0 transmits request signals for requesting sensing level via the control apparatus C to the fire alarm sensors SS2 and SS3 which are located near the fire alarm sensor SS1, and then, answer signals including the sensing levels are sent from the fire alarm sensors SS2 and SS3 to the management center B0. Then the management center B0 can obtain status information of the sensing levels of respective fire alarm sensors SS1 to SS3: SS1=7, SS2=4 and SS3=3.

In a second operation example, the management center B0 periodically transmits request signals for requesting sensing level via the control apparatus C to all the fire alarm sensors S1, S2 and SS1 to SS3, and then, answer signals including the sensing levels are sent from all the fire alarm sensors S1, S2 and SS1 to SS3 to the management center B0. Then the management center B0 can obtain status information of the sensing levels of respective fire alarm sensors S1, S2 and SS1 to SS3: S1=2, S2=4, SS1=2, SS2=3 and SS3=1.

As shown in the first operation examples of the nineteenth and twenties preferred embodiments, the following communication procedure may be employed such that the local terminal apparatus is used as a starting point, and the local terminal apparatus voluntarily makes an event transmission of a status signal to the remote terminal apparatus via the control apparatus.

Advantageous Effects of Preferred Embodiments

As apparent from the above description, according to a preferred embodiment of the present invention, the control apparatus comprises gateway means, and therefore, the control apparatus can be made into a small size, and a cost reduction can be achieved. Further, it is possible to obtain the status of the predetermined function or processing of the local terminal apparatus at the side of the remote terminal apparatus in a real time. Further, it is possible to know the information obtained from the answer signal, that is, to know the status of the predetermined function or processing of the local terminal apparatus via the information output means of the remote terminal apparatus.

Further, according to another preferred embodiment of the present invention, the remote control with respect to the local terminal apparatus can be carried out by the remote terminal apparatus, and it is possible to confirm the load control status of the local terminal apparatus after the changeover by the remote terminal apparatus.

Further, according to a further preferred embodiment of the present invention, it is possible to confirm the supervisory status of the supervisory means of the local terminal apparatus by the remote terminal apparatus.

Further, according to a still further preferred embodiment of the present invention, the external network is preferably the Internet. With the above arrangement, for example, in the case where the remote terminal apparatus to the local terminal apparatus is located in a toll area and out of a local area, the remote terminal apparatus is connected with the Internet via an access point of a communication carrier, which exists in the local area to the remote terminal apparatus. By this arrangement, it is possible to connect the remote terminal apparatus to the local terminal apparatus at a local call charge, and this leads to that a connection communication charge becomes cheaper.

Further, according to a still more further preferred embodiment of the present invention, in the communication system, the remote terminal apparatus is preferably provided in a management center. Therefore, the management of the predetermined facility can be performed by the management center. For example, a connection operation is possible between a plurality of object groups to be managed such as many buildings of apartment houses, many buildings in a town or the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A communication system comprising:
   a local terminal apparatus connected with a local network provided in a predetermined facility;
   a remote terminal apparatus connected with an external network; and
   a control apparatus interposed between the local network and the external network,
   wherein the local terminal apparatus comprises:
   processing executing means for executing a predetermined processing; and
   reply means for returning an answer signal including a status information of said processing executing means via the local network in response to a request signal received via the local network;
   wherein said remote terminal apparatus comprises:
   input means for inputting a predetermined operation;
   transceiver means for transmitting the request signal including control information corresponding to an operation inputted by said input means via the external network, and receiving an answer signal corresponding to the request signal via the local network; and
   information output means for outputting the status information included in the answer signal received by said transceiver means, and
   wherein said control apparatus comprises:
   gateway means for receiving the request signal transmitted from said remote terminal apparatus via the external network, and thereafter, transmitting the received request signal to the local terminal apparatus via the local network, and for receiving an answer signal corresponding to the request signal from the local terminal apparatus via the local network, and thereafter, transmitting the received answer signal to the remote terminal apparatus via the external network, wherein said communication system further comprises:

a plurality of said local terminal apparatuses and a plurality of said remote terminal apparatuses, wherein said control apparatus comprises storage means for storing a transmission destination table including a transmission destination indicative of which one of said plurality of remote terminal apparatuses the answer signal should be transmitted to, for each of said local terminal apparatus, and wherein said gateway means transmits the received answer signal to the remote terminal apparatus determined by referring to the transmission destination table stored in said storage means, via the external network.

2. A communication system comprising:

a local terminal apparatus connected with a local network provided in a predetermined facility;

a remote terminal apparatus connected with an external network; and a control apparatus interposed between the local network and the external network, wherein the local terminal apparatus comprises:

processing executing means for executing a predetermined processing; and reply means for returning an answer signal including a status information of said processing executing means via the local network in response to a request signal received via the local network;

wherein said remote terminal apparatus comprises:

input means for inputting a predetermined operation;

transceiver means for transmitting the request signal including control information corresponding to an operation inputted by said input means via the external network, and receiving an answer signal corresponding to the request signal via the local network; and information output means for outputting the status information included in the answer signal received by said transceiver means, and wherein said control apparatus comprises:

gateway means for receiving the request signal transmitted from said remote terminal apparatus via the external network, and thereafter, transmitting the received request signal to the local terminal apparatus via the local network, and for receiving an answer signal corresponding to the request signal from the local terminal apparatus via the local network, and thereafter, transmitting the received answer signal to the remote terminal apparatus via the external network, wherein said communication system further comprises:

a plurality of said local terminal apparatuses and a plurality of said remote terminal apparatuses, wherein said control apparatus comprises storage means for storing a transmission destination table including a transmission destination indicative of which one of said plurality of remote terminal apparatuses the answer signal should be transmitted to, for each of said local terminal apparatus and for each status information of the received answer signal, and wherein said gateway means transmits the received answer signal to the remote terminal apparatus determined by referring to the transmission destination table stored in said storage means, via the external network.

3. A communication system comprising:

a local terminal apparatus connected with a local network provided in a predetermined facility;

a remote terminal apparatus connected with an external network; and a control apparatus interposed between the local network and the external network, wherein the local terminal apparatus comprises:

processing executing means for executing a predetermined processing; and reply means for returning an answer signal including a status information of said processing executing means via the local network in response to a request signal received via the local network;

wherein said remote terminal apparatus comprises:

input means for inputting a predetermined operation;

transceiver means for transmitting the request signal including control information corresponding to an operation inputted by said input means via the external network, and receiving an answer signal corresponding to the request signal via the local network; and information output means for outputting the status information included in the answer signal received by said transceiver means, and wherein said control apparatus comprises:

gateway means for receiving the request signal transmitted from said remote terminal apparatus via the external network, and thereafter, transmitting the received request signal to the local terminal apparatus via the local network, and for receiving an answer signal corresponding to the request signal from the local terminal apparatus via the local network, and thereafter, transmitting the received answer signal to the remote terminal apparatus via the external network, wherein said communication system further comprises:

a plurality of said local terminal apparatuses and a plurality of said remote terminal apparatuses, wherein each of said local terminal apparatuses comprises storage means for storing a transmission destination table including a transmission destination indicative of which one of said plurality of remote terminal apparatuses the answer signal should be transmitted to, and wherein said reply means transmits the answer signal to be transmitted to the remote terminal apparatus determined by referring to the transmission destination table stored in said storage means, via the local network, said control apparatus and the external network.

4. A communication system comprising:

a local terminal apparatus connected with a local network provided in a predetermined facility;

a remote terminal apparatus connected with an external network; and a control apparatus interposed between the local network and the external network.

wherein the local terminal apparatus comprises:

processing executing means for executing a predetermined processing; and reply means for returning an answer signal including a status information of said processing executing means via the local network in response to a request signal received via the local network;

wherein said remote terminal apparatus comprises:

input means for inputting a predetermined operation;

transceiver means for transmitting the request signal including control information corresponding to an operation inputted by said input means via the external network, and receiving an answer signal corresponding to the request signal via the local network; and information output means for outputting the status information included in the answer signal received by said transceiver means, and wherein said control apparatus comprises:

gateway means for receiving the request signal transmitted from said remote terminal apparatus via the external network, and thereafter, transmitting the received request signal to the local terminal apparatus via the local network, and for receiving an answer signal corresponding to the request signal from the local terminal apparatus via the local network, and thereafter, transmitting the received answer signal to the remote terminal apparatus via the external network, wherein said communication system further comprises:

a plurality of said local terminal apparatuses and a plurality of said remote terminal apparatuses, wherein each of said local terminal apparatuses comprises storage means for storing a transmission destination table including a transmission destination indicative of which one of said plurality of remote terminal apparatuses the answer signal should be transmitted to, in accordance to the status information of the answer signal, and wherein said reply means transmits the answer signal to be transmitted to the remote terminal apparatus determined by referring to the transmission destination table stored in said storage means, via the local network, said control apparatus and the external network.

5. A communication system comprising:

a local terminal apparatus connected with a local network provided in a predetermined facility;

a remote terminal apparatus connected with an external network; and a control apparatus interposed between the local network and the external network, wherein the local terminal apparatus comprises:

processing executing means for executing a predetermined processing; and reply means for returning an answer signal including a status information of said processing executing means via the local network in response to a request signal received via the local network;

wherein said remote terminal apparatus comprises:

input means for inputting a predetermined operation;

transceiver means for transmitting the request signal including control information corresponding to an operation inputted by said input means via the external network, and receiving an answer signal corresponding to the request signal via the local network; and information output means for outputting the status information included in the answer signal received by said transceiver means, and wherein said control apparatus comprises:

gateway means for receiving the request signal transmitted from said remote terminal apparatus via the external network, and thereafter, transmitting the received request signal to the local terminal apparatus via the local network, and for receiving an answer signal corresponding to the request signal from the local terminal apparatus via the local network, and thereafter, transmitting the received answer signal to the remote terminal apparatus via the external network, wherein said communication system further comprises:

a plurality of said local terminal apparatuses and a plurality of said remote terminal apparatuses, wherein each of said remote terminal apparatuses comprises storage means for storing a transmission destination table including a transmission destination indicative of which one of said plurality of remote terminal apparatuses the answer signal corresponding to the request signal should be transmitted to, wherein said transceiver means transmits via the external network the request signal further including a transmission destination information of the answer signal corresponding to the request signal, the transmission destination information being indicated by the transmission destination table stored in said storage means, and wherein said reply means transmits the answer signal to be transmitted to the remote terminal apparatus indicated by the transmission destination information included in the request signal, via the local network, said control apparatus and the external network.

6. A communication system comprising:

a local terminal apparatus connected with a local network provided in a predetermined facility;

a remote terminal apparatus connected with an external network; and a control apparatus interposed between the local network and the external network, wherein the local terminal apparatus comprises:

processing executing means for executing a predetermined processing; and reply means for returning an answer signal including a status information of said processing executing means via the local network in response to a request signal received via the local network;

wherein said remote terminal apparatus comprises:

input means for inputting a predetermined operation;

transceiver means for transmitting the request signal including control information corresponding to an operation inputted by said input means via the external network, and receiving an answer signal corresponding to the request signal via the local network; and information output means for outputting the status information included in the answer signal received by said transceiver means, and wherein said control apparatus comprises:

gateway means for receiving the request signal transmitted from said remote terminal apparatus via the external network, and thereafter, transmitting the received request signal to the local terminal apparatus via the local network, and for receiving an answer signal corresponding to the request signal from the local terminal apparatus via the local network, and thereafter, transmitting the received answer signal to the remote terminal apparatus via the external network, wherein said communication system further comprises:

a plurality of said local terminal apparatuses and a plurality of said remote terminal apparatuses, wherein each of said remote terminal apparatuses comprises storage means for storing a transmission destination table including a transmission destination indicative of which one of said plurality of remote terminal apparatuses the answer signal corresponding to the request signal should be transmitted to, in accordance to the status information of the answer signal, wherein the transceiver means transmits via the external network the request signal further including a transmission destination information of the answer signal corresponding to the request signal, the transmission destination information being indicated by the transmission destination table stored in said storage means, and wherein said reply means transmits the answer signal to be transmitted to the remote terminal apparatus, which is indicated by the transmission destination information included in the request signal and which corresponds to status information of the answer signal, via the local network, said control apparatus and the external network.

* * * * *